United States Patent
Kawada

(10) Patent No.: US 9,342,418 B2
(45) Date of Patent: May 17, 2016

(54) STORAGE SYSTEM, STORAGE CONTROL DEVICE AND DATA TRANSFER METHOD

(71) Applicant: FUJITSU LIMITED, Kawasaki-shi, Kanagawa (JP)

(72) Inventor: Takashi Kawada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 14/291,060

(22) Filed: May 30, 2014

(65) Prior Publication Data

US 2015/0032981 A1   Jan. 29, 2015

(30) Foreign Application Priority Data

Jul. 23, 2013   (JP) .................................. 2013-152841

(51) Int. Cl.
*G06F 12/14* (2006.01)
*G06F 11/20* (2006.01)
*G06F 3/06* (2006.01)

(52) U.S. Cl.
CPC .......... *G06F 11/2064* (2013.01); *G06F 3/0656* (2013.01); *G06F 11/2069* (2013.01); *G06F 11/2082* (2013.01); *G06F 11/2094* (2013.01); *G06F 11/2074* (2013.01)

(58) Field of Classification Search
CPC ....... G06F 3/0619; G06F 3/065; G06F 3/067; G06F 3/0689; G06F 3/0656; G06F 11/2082; G06F 11/2069; G06F 11/2094; G06F 11/2064; G06F 11/2074

See application file for complete search history.

(56) References Cited

U.S. PATENT DOCUMENTS

| | | | | |
|---|---|---|---|---|
| 6,052,758 A * | 4/2000 | Crockett | ............. | G06F 11/2082 711/113 |
| 7,971,011 B2 | 6/2011 | Furukawa et al. | | |
| 2011/0197040 A1* | 8/2011 | Oogai | ................. | G06F 11/2058 711/162 |
| 2014/0195756 A1* | 7/2014 | Lahousse | ............. | G06F 3/0619 711/162 |

FOREIGN PATENT DOCUMENTS

| | | |
|---|---|---|
| JP | 2006-106883 | 4/2006 |
| JP | 2006-260292 | 9/2006 |
| JP | 2007-511844 | 5/2007 |
| WO | 2005/055040 | 6/2005 |

* cited by examiner

*Primary Examiner* — Hiep Nguyen
(74) *Attorney, Agent, or Firm* — Fujitsu Patent Center

(57) ABSTRACT

When a redundancy failures occurs in sequentiality-guaranteed data transfer, data transfer in a short period of time is resumed such that wherein when a factor by which the second storage device stops processing of the storage system is multiple failures of the two or more redundant control devices during a process of developing data to a storage medium in the second storage device, a session managing unit sets inconsistency as the copy session state, and a buffer managing unit sets the buffer data lost state, and when a data transfer process is resumed between the first storage device and the second storage device, the session managing unit sets consistency as the copy session state when the buffer data lost state is set by the buffer managing unit.

9 Claims, 21 Drawing Sheets

FIG. 5

| 1000 | UNALLOCATED |
|------|-------------|
| 1001 | UNALLOCATED |
| 1002 | UNALLOCATED |
| 1003 | ALLOCATED |
| 1004 | ALLOCATED |
| 1005 | UNALLOCATED |
| 1006 | UNALLOCATED |
| 1007 | UNALLOCATED |
| 1100 | UNALLOCATED |
| 1101 | UNALLOCATED |
| 1102 | UNALLOCATED |
| 1103 | ALLOCATED |
| 1104 | ALLOCATED |
| 1105 | UNALLOCATED |
| 1106 | UNALLOCATED |
| 1107 | UNALLOCATED |
| 1200 | UNALLOCATED |
| 1201 | UNALLOCATED |
| 1202 | UNALLOCATED |
| 1203 | ALLOCATED |
| 1204 | ALLOCATED |
| 1205 | UNALLOCATED |
| 1206 | UNALLOCATED |
| 1207 | UNALLOCATED |
| 1300 | UNALLOCATED |
| 1301 | UNALLOCATED |
| 1302 | UNALLOCATED |
| 1303 | ALLOCATED |
| 1304 | ALLOCATED |
| 1305 | UNALLOCATED |
| 1306 | UNALLOCATED |
| 1307 | UNALLOCATED |

 101, 201

FIG. 6

| TRANSMITTING BUFFER SIZE (MB) | 64 |
|---|---|

| GROUP ID | 0 |
|---|---|
| 1CM 1 BUFFER SIZE (MB) | 8 |
| BUFFER LIST SIZE (KB) | 8 |

| ATTRIBUTE | TRANSMITTING HOUSING (OR RECEIVING HOUSING) |
|---|---|

| TOTAL BUFFER SIZE PER CM (MB) | 64 |
|---|---|
| NUMBER OF TRANSMITTING BUFFER SETS | 8 |

| BUFFER STATE | ACTIVE OR HALT OR BUFFERING |
|---|---|
| NEGOTIATION STATE | NEGOTIATED |
| RECEPTION SIDE BUFFER DATA LOST STATE | NON-LOST STATE |
| BUFFER SET ID BEING SUBJECTED TO DEVELOPMENT PROCESS | 5 |
| BUFFER SET 0 USAGE STATE | IN USE |
| BUFFER SET 1 USAGE STATE | IN USE |
| BUFFER SET 2 USAGE STATE | IN USE |
| BUFFER SET 3 USAGE STATE | IN USE |
| BUFFER SET 4 USAGE STATE | IN USE |
| BUFFER SET 5 USAGE STATE | IN USE |
| BUFFER SET 6 USAGE STATE | UNUSED |
| BUFFER SET 7 USAGE STATE | UNUSED |
| BUFFER SET 8 USAGE STATE | UNUSED |
| ⋮ | ⋮ |

| BUFFER SET ID | 0 |
|---|---|
| BUFFER SET LINK Prev | 0xffff |
| BUFFER SET LINK Next | 1 |

| TRANSMITTING BUFFER ID | RECEIVING BUFFER ID | BUFFER TRANSMISSION STATE | BUFFER SET MANAGEMENT TABLE RECEPTION STATE |
|---|---|---|---|
| 0x1000 | 0x1000 | TRANSMITTED | TRANSMITTED |
| 0x1100 | 0x1100 | TRANSMITTED | TRANSMITTED |
| 0x1200 | 0x1200 | TRANSMITTED | TRANSMITTED |
| 0x1300 | 0x1300 | TRANSMITTED | TRANSMITTED |
| .. | .. | .. | .. |

| BUFFER SET ID | 1 |
|---|---|
| BUFFER SET LINK Prev | 0 |
| BUFFER SET LINK Next | 2 |

| TRANSMITTING BUFFER ID | RECEIVING BUFFER ID | BUFFER TRANSMISSION STATE | BUFFER SET MANAGEMENT TABLE RECEPTION STATE |
|---|---|---|---|
| 0x1001 | 0x1001 | BEING TRANSMITTED | TRANSMITTED |
| 0x1101 | 0x1101 | BEING TRANSMITTED | BEING TRANSMITTED |
| 0x1201 | 0x1201 | BEING TRANSMITTED | TRANSMITTED |
| 0x1301 | 0x1301 | BEING TRANSMITTED | TRANSMITTED |
| .. | .. | .. | .. |

| BUFFER SET ID | 0 |
|---|---|
| BUFFER SET LINK Prev | 0xffff |
| BUFFER SET LINK Next | 1 |

| TRANSMITTING BUFFER ID | RECEIVING BUFFER ID | BUFFER RECEPTION STATE | BUFFER SET MANAGEMENT TABLE RECEPTION STATE | RECEIVABLE/ UNRECEIVABLE STATE |
|---|---|---|---|---|
| 0x1000 | 0x1000 | RECEIVED | RECEIVED | UNRECEIVABLE BY MIRROR |
| 0x1100 | 0x1100 | RECEIVED | RECEIVED | UNRECEIVABLE BY LOCAL |
| 0x1200 | 0x1200 | RECEIVED | RECEIVED | RECEIVABLE |
| 0x1300 | 0x1300 | RECEIVED | RECEIVED | RECEIVABLE |
| ... | ... | ... | ... | ... |

| BUFFER SET ID | 1 |
|---|---|
| BUFFER SET LINK Prev | 0 |
| BUFFER SET LINK Next | 2 |

| TRANSMITTING BUFFER ID | RECEIVING BUFFER ID | BUFFER RECEPTION STATE | BUFFER SET MANAGEMENT TABLE RECEPTION STATE | RECEIVABLE/ UNRECEIVABLE STATE |
|---|---|---|---|---|
| 0x1001 | 0x1001 | RECEIVED | RECEIVED | UNRECEIVABLE BY MIRROR |
| 0x1101 | 0x1101 | NOT RECEIVED | NOT RECEIVED | UNRECEIVABLE BY LOCAL |
| 0x1201 | 0x1201 | NOT RECEIVED | RECEIVED | RECEIVABLE |
| 0x1301 | 0x1301 | NOT RECEIVED | RECEIVED | RECEIVABLE |
| ... | ... | ... | ... | ... |

203

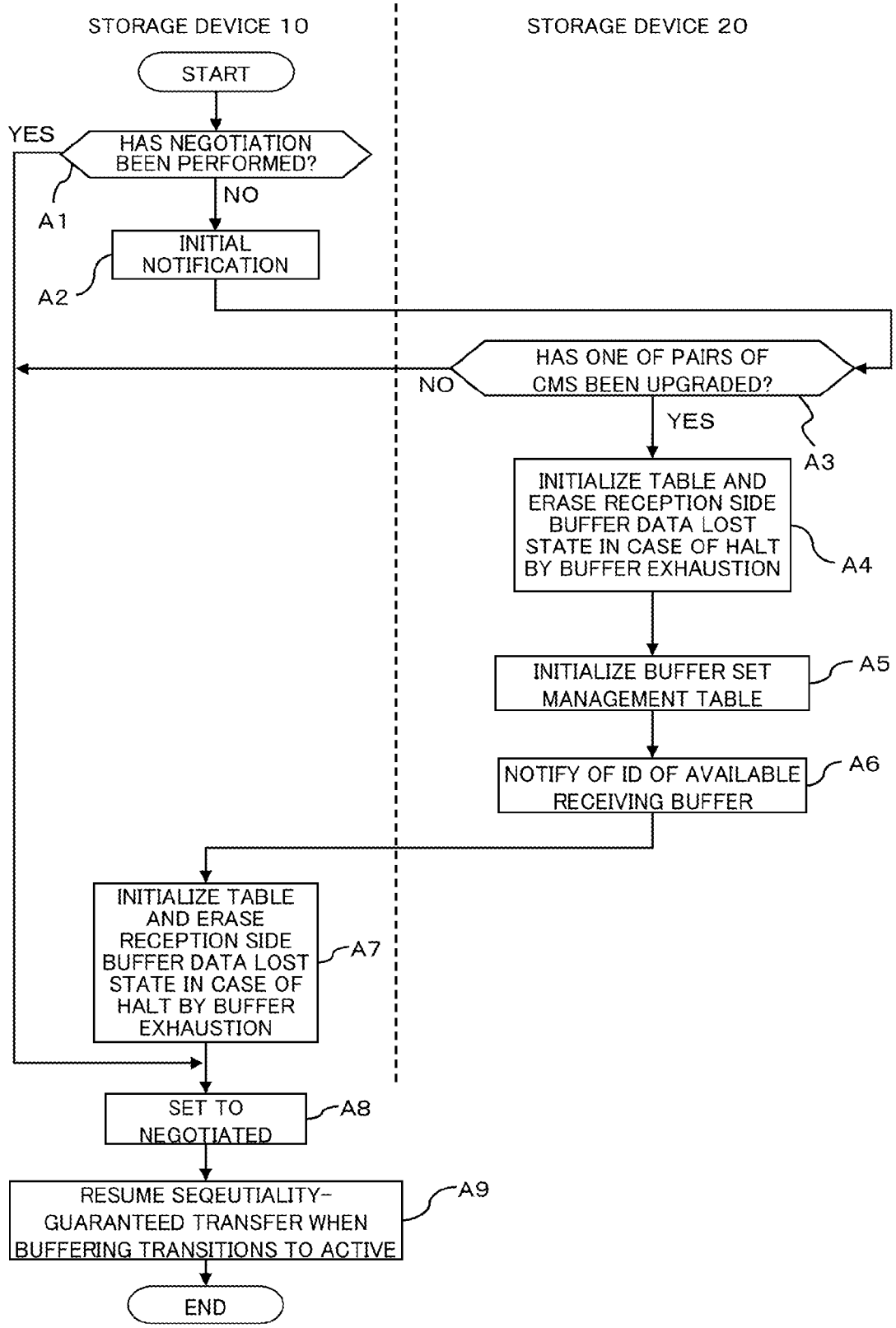

FIG. 11

| 1000 | UNALLOCATED |
|---|---|
| 1001 | UNALLOCATED |
| 1002 | UNALLOCATED |
| 1003 | UNALLOCATED |
| 1004 | UNALLOCATED |
| 1005 | UNALLOCATED |
| 1006 | UNALLOCATED |
| 1007 | UNALLOCATED |
| 1100 | UNALLOCATED |
| 1101 | UNALLOCATED |
| 1102 | UNALLOCATED |
| 1103 | UNALLOCATED |
| 1104 | UNALLOCATED |
| 1105 | UNALLOCATED |
| 1106 | UNALLOCATED |
| 1107 | UNALLOCATED |
| 1200 | UNALLOCATED |
| 1201 | UNALLOCATED |
| 1202 | UNALLOCATED |
| 1203 | UNALLOCATED |
| 1204 | UNALLOCATED |
| 1205 | UNALLOCATED |
| 1206 | UNALLOCATED |
| 1207 | UNALLOCATED |
| 1300 | UNALLOCATED |
| 1301 | UNALLOCATED |
| 1302 | UNALLOCATED |
| 1303 | UNALLOCATED |
| 1304 | UNALLOCATED |
| 1305 | UNALLOCATED |
| 1306 | UNALLOCATED |
| 1307 | UNALLOCATED |

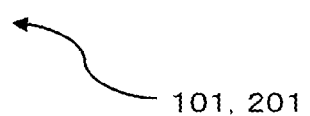
101, 201

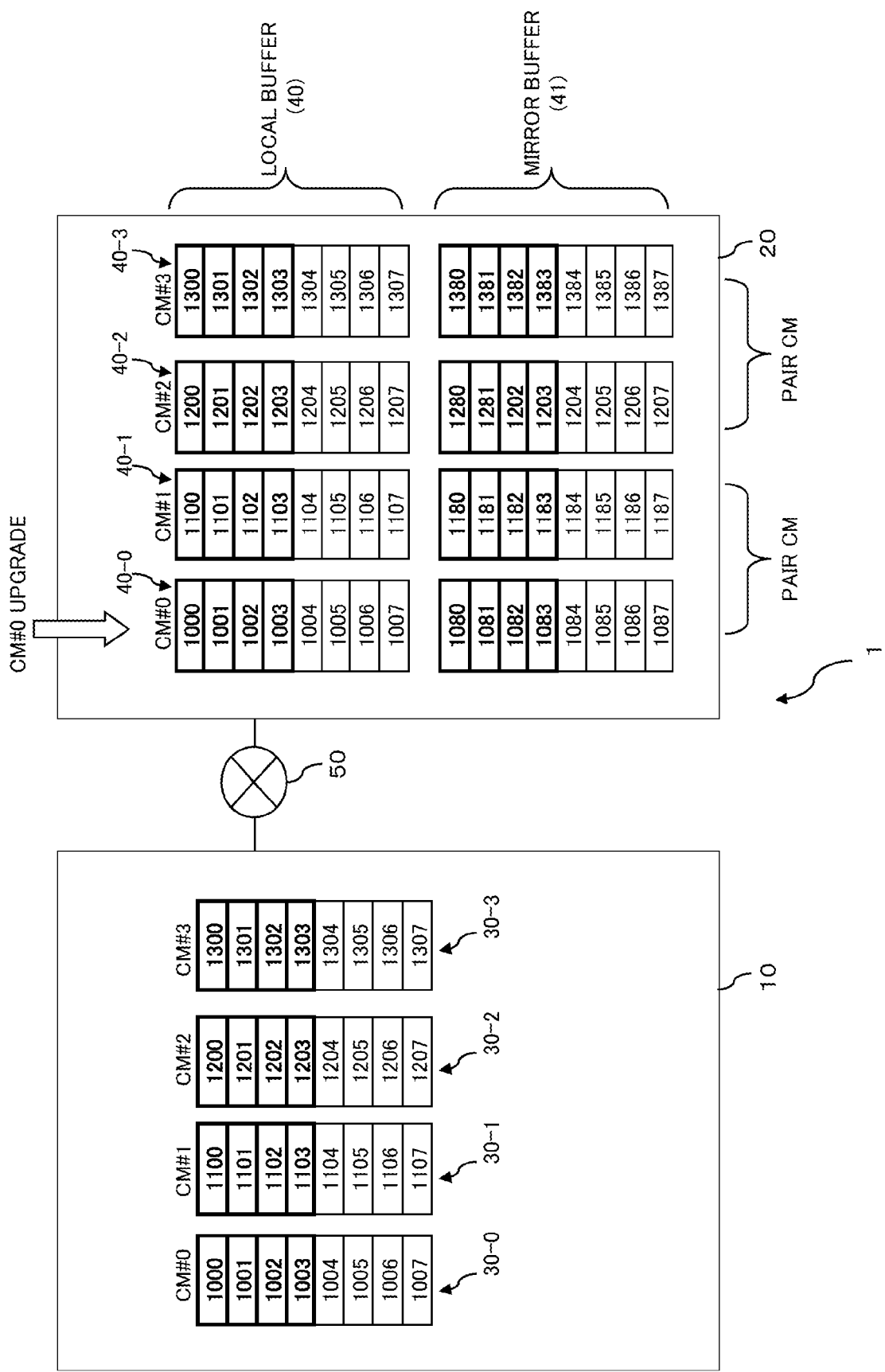

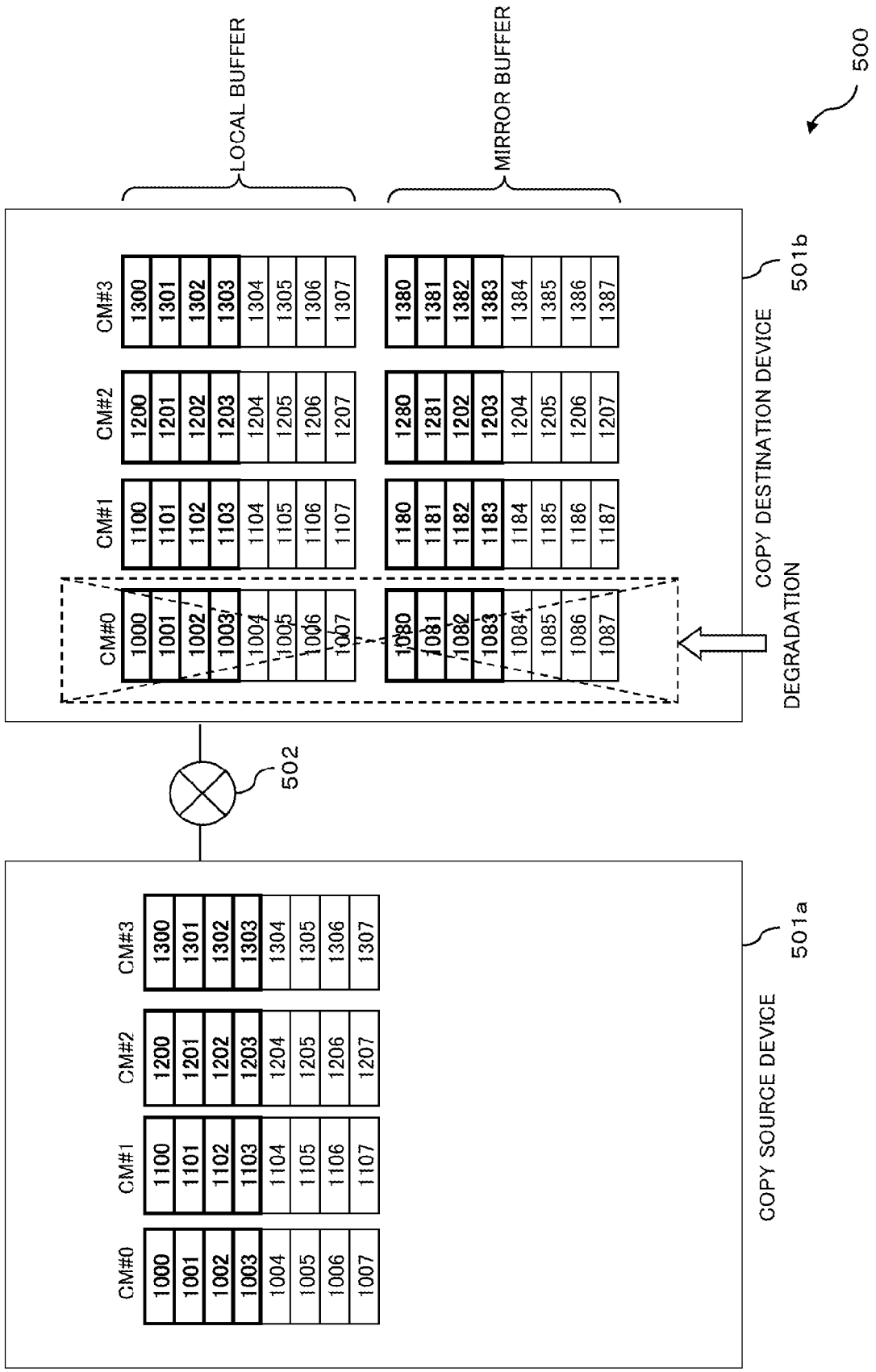

STORAGE SYSTEM, STORAGE CONTROL DEVICE AND DATA TRANSFER METHOD

CROSS-REFERENCE TO RELATED APPLICATION

This application is based upon and claims the benefit of priority of the prior Japanese Patent application No. 2013-152841, filed on Jul. 23, 2013, the entire contents of which are incorporated herein by reference.

FIELD

The embodiment discussed herein is directed to a storage system, a storage control device, and a data transfer method.

BACKGROUND

In storage systems, a plurality of storage devices are provided, and backup is performed by copying data of one storage (business storage) device to another storage (backup storage) device.

Further, remote copy functions of copying data of one storage device to another storage device installed at a geographically separated place among a plurality of storage devices arranged at remote sites have been also known. As one of such remote copy functions, a remote equivalent copy (REC) consistency mode function of guaranteeing writing sequentiality of data when remote copying is performed in an asynchronous mode has been known.

As a storage device, for example, redundant arrays of inexpensive disks (RAID) devices are used. The RAID device is one in which a plurality of hard disk drives (HDDs) are combined and managed as a redundant storage, and provides a higher-level device with a virtual storage (logical volume). The RAID device is a storage system of a distributed cache memory type, and performs a process of reading/writing data of a logical volume in units of controller modules (CMs).

In the REC function, data in a storage medium in a storage device (a copy source device) of a copy source is stored in a recording-dedicated buffer in the copy source device prepared for each CM. Further, the recording-dedicated buffer of each CM is divided into a plurality of areas (buffer areas) and managed in order to guarantee sequentiality of a data reading/writing process. The divided individual buffer areas are managed as generations.

When the buffer areas of the recording-dedicated buffer are fully filled or a certain period of time elapses after data storage starts, the copy source device transmits data in the buffer areas of the same generation to a storage device (a copy destination device) of a copy destination connected via a network together. Hereinafter, in the REC function, a technique of transmitting data of the same generation in the recording-dedicated buffer of the copy source device to a storage device of a copy destination connected via a network may be referred to as a batch transmission scheme.

The copy destination device first stores received data in the recording-dedicated buffer. When all data is received, the copy destination device develops collectively data in the recording-dedicated buffer into a recording medium of the copy destination.

In the REC function, the buffer areas of the same generation on each CM are collectively controlled in units of buffer sets in order to perform copying of a batch transmission scheme guaranteeing sequentiality using the recording-dedicated buffer as described above. Further, sequentiality is guaranteed by developing data from the copy source recording-dedicated buffer in units of buffer sets.

FIG. 21 is a diagram illustrating a conventional buffer configuration of a storage system. In a storage system 500 illustrated in FIG. 21, two storage devices 501a and 501b are connected to each other via a network 502. In the example illustrated in FIG. 21, the storage device 501a is the copy source device, and the storage device 501b is the copy destination device. Hereinafter, the storage device 501a may be referred to as a copy source device 501a, and the storage device 501b may be referred to as a copy destination device 501b.

Each of the storage devices 501a and 501b includes four CM #0 to #3. In the copy source device 501a, each of the CMs #0 to #3 includes a transmitting buffer. Meanwhile, in the copy destination device, each of the CMs #0 to #3 includes two receiving buffers (recording-dedicated buffers) of a local buffer and a mirror buffer.

Further, in the copy source device 501a, the transmitting buffer of each CM is divided into 8 buffer areas (corresponding to 8 generations). Meanwhile, in the copy destination device 501b, the local buffer and the mirror buffer of each of the CMs #0 to #3 are divided into 8 buffer areas (corresponding to 8 generations), similarly to the copy destination device 501b.

In the copy destination device 501b, data which is transmitted from the copy source device 501a and transferred from a port (not illustrated) to the local buffer of each CM is duplicated by storing a copy thereof in the mirror buffer of another CM.

For example, in the copy source device 501a, data to be transferred to the local buffer of the CM #0 is duplicated by storing a copy thereof in the mirror buffer of the CM #1. Similarly, data to be transferred to the local buffer of the CM #3 is duplicated to the mirror buffer of the CM #0, and data to be transferred to the local buffer of the CM #1 is duplicated to the mirror buffer of the CM #2. Further, data to be transferred to the local buffer of the CM #2 is duplicated to the mirror buffer of the CM #3.

Here, in the remote copy technique, a technique in which in the copy destination device 501b, when a certain CM is degraded and enters a disable state, a transmission destination of data being transmitted to the local buffer of the corresponding CM is switched to the mirror buffer of another CM to which the data is being duplicated, so that REC consistency transfer is continuously performed is known. In other words, a degrade mirror monitoring technique is known.

For example, in the copy destination device 501b, when the CM #0 has degraded, a process of developing data of the CM #0 is continued using (duplicated) data stored in the mirror buffer of the CM #1. Further, as the CM #0 has degraded, the data of the CM #0 stored in the mirror buffer of the CM #1 becomes a non-duplexing state (a duplexing-broken state).

Further, for data being transmitted to the local buffer of the CM #3, the REC consistency transfer is continued in the duplexing-broken state while causing the data not to be transferred to the mirror buffer of the CM #0 since it is impossible to use the mirror buffer of the CM #0. Hereinafter, a state in which monitoring is being performed so that duplexing is not performed may be referred to as a duplexing inhibition monitoring state.

In the REC consistency transfer, the copy destination device 501b sequentially transmits a buffer release notification and an available buffer notification to the copy source device 501a each time development of data of the recording-dedicated buffer is completed or released.

For example, when the CM #0 has degraded, the copy destination device 501b transmits an ID (a receiving buffer ID) representing a buffer area of an available (alive) buffer other than the buffer of the degraded CM #0 to the copy source device 501a as the available buffer notification.

The copy source device 501a registers a reception side buffer ID informed by the available buffer notification and a reception side buffer ID excluding a reception side buffer ID already allocated by a transmitting buffer to an available buffer management table (not illustrated) at a transmission side.

When transferring data, the copy source device 501a allocates the reception side buffer ID registered to the available buffer management table, and transmits data to the copy destination device 501b. In the copy destination device 501b, when data is received, a CM of a transfer destination of the data is determined with reference to the reception side buffer ID attached to the data.

Meanwhile, in the copy destination device 501b that is in the duplexing inhibition state due to degradation of some CMs, when degradation is solved by replacement of broken CMs or the like, it is necessary to release the duplexing inhibition state. An operation of releasing the duplexing inhibition state and causing the buffer to the duplexing state is referred to as "duplexing reconstruction."

Japanese Laid-open Patent Publication No. 2006-106883
Japanese Laid-open Patent Publication No. 2006-260292
Japanese Laid-open Patent Publication No. 2007-511844

However, in the conventional storage system, even before duplexing reconstruction, that is, even in the state in which there is a non-duplexed buffer, a CM including a non-duplexed buffer may degrade. When a CM including a non-duplexed buffer is degraded, an error suspend state in which it is impossible to use a REC session is caused.

For example, in the example described with reference to FIG. 21, in the copy destination device 501b, when the CM #0 has degraded and thus in the duplexing inhibition monitoring state, data of the CM #3 is in the duplexing-broken state. In this state, when the CM #3 is further degraded, in the copy destination device 501b, the data of the CM #3 is lost, leading to the error suspend state.

In the error suspend state, it is necessary to re-establish an REC session between the copy source device 501a and the copy destination device 501b, and it is necessary to perform copying of all data of the copy source device 501a as initial copying from the beginning. Thus, there is a problem in that it takes a long time to resume the sequentiality-guaranteed data transfer.

SUMMARY

To this end, a storage system is a storage system that transfers sequentiality-guaranteed data from a first storage device to a second storage device connected via a network, and includes two or more redundant receiving buffers that are respectively disposed in two or more redundant control devices in the second storage device and store data redundantly, a session managing unit that manages a copy session state representing whether there is consistency of a copy state of the sequentiality-guaranteed data between the first storage device and the second storage device, and a buffer managing unit that manages a buffer data lost state representing that the sequentiality-guaranteed data has been lost in all of the two or more redundant receiving buffers, wherein when a factor by which the second storage device stops processing of the storage system is multiple failures of the two or more redundant control devices during a process of developing data to a storage medium in the second storage device, the session managing unit sets inconsistency as the copy session state, and the buffer managing unit sets the buffer data lost state, and when a data transfer process is resumed between the first storage device and the second storage device, the session managing unit sets consistency as the copy session state when the buffer data lost state is set by the buffer managing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating receiving buffer ID management tables in a storage system according to an exemplary embodiment;

FIG. 6 is a diagram illustrating buffer management tables according to an exemplary embodiment;

FIG. 7 is a diagram illustrating a buffer set management table according to an exemplary embodiment;

FIG. 9 is a diagram illustrating a buffer set management table according to an exemplary embodiment;

FIG. 10 is a flowchart for describing a first negotiation process in a storage system according to an exemplary embodiment;

FIG. 11 is a diagram illustrating a receiving buffer ID management table immediately after first negotiation in a storage system according to an exemplary embodiment;

FIG. 20 is a diagram illustrating a state in which upgrading has been performed in a storage device of a storage system according to an exemplary embodiment; and FIG. 21 is a diagram illustrating a conventional buffer configuration of a storage system.

DESCRIPTION OF EMBODIMENT(S)

Figure 1:
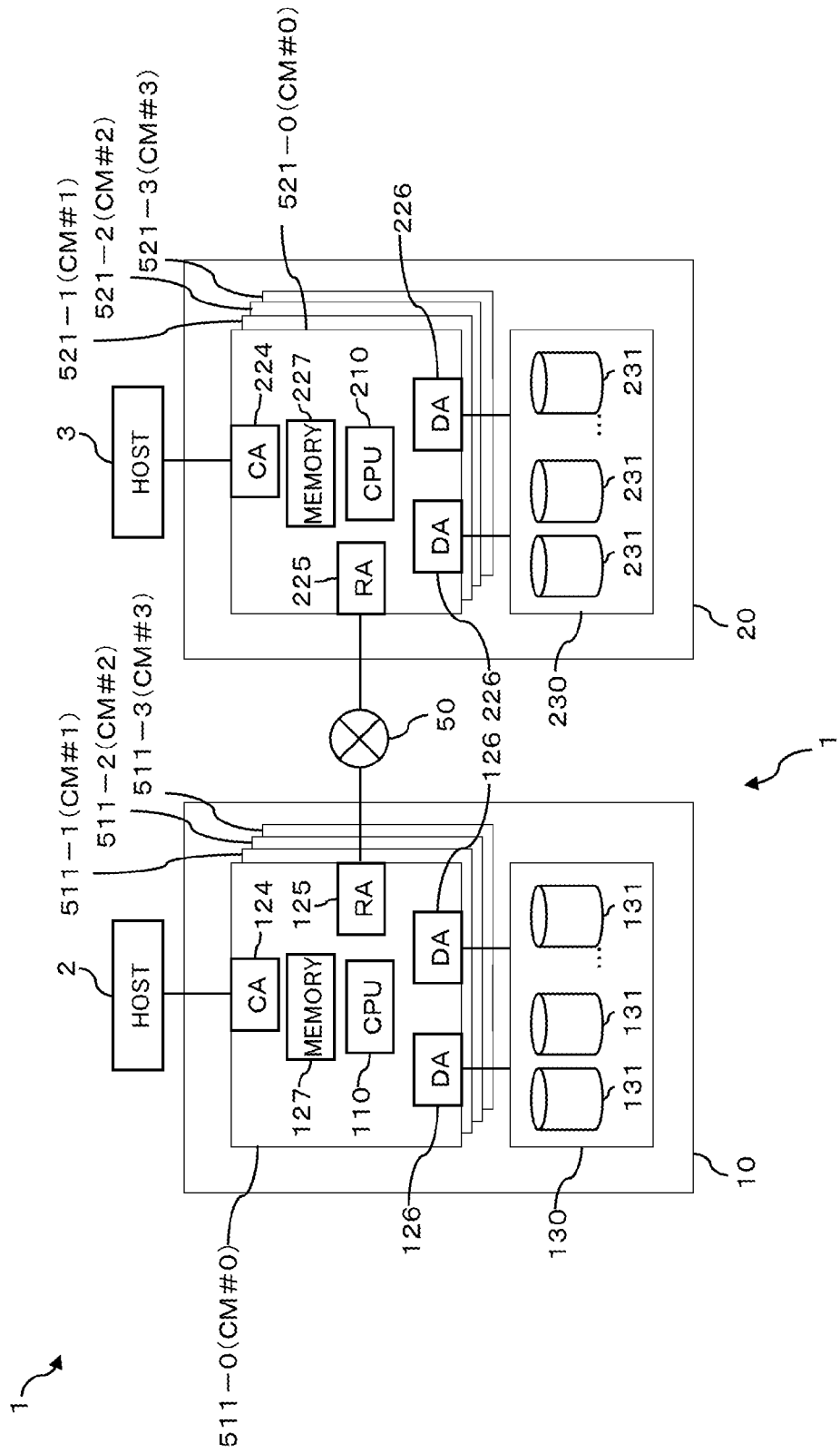
FIG. 1 is a diagram illustrating a hardware configuration of a storage system according to an exemplary embodiment.

Hereinafter, an exemplary embodiment of a storage system, a storage control device, and a data transfer method will be described with reference to the appended drawings. The following embodiment is merely exemplary and not intended to exclude applications of various changes or techniques which are not described below. In other words, the present embodiment can be variously modified (for example, an embodiment may be combined with each modified example) within the scope not departing from the gist thereof. Further, the purpose of the drawings is not to illustrate only components illustrated in the drawings, and any other component or the like may be included.

(A) Configuration

Figure 2:
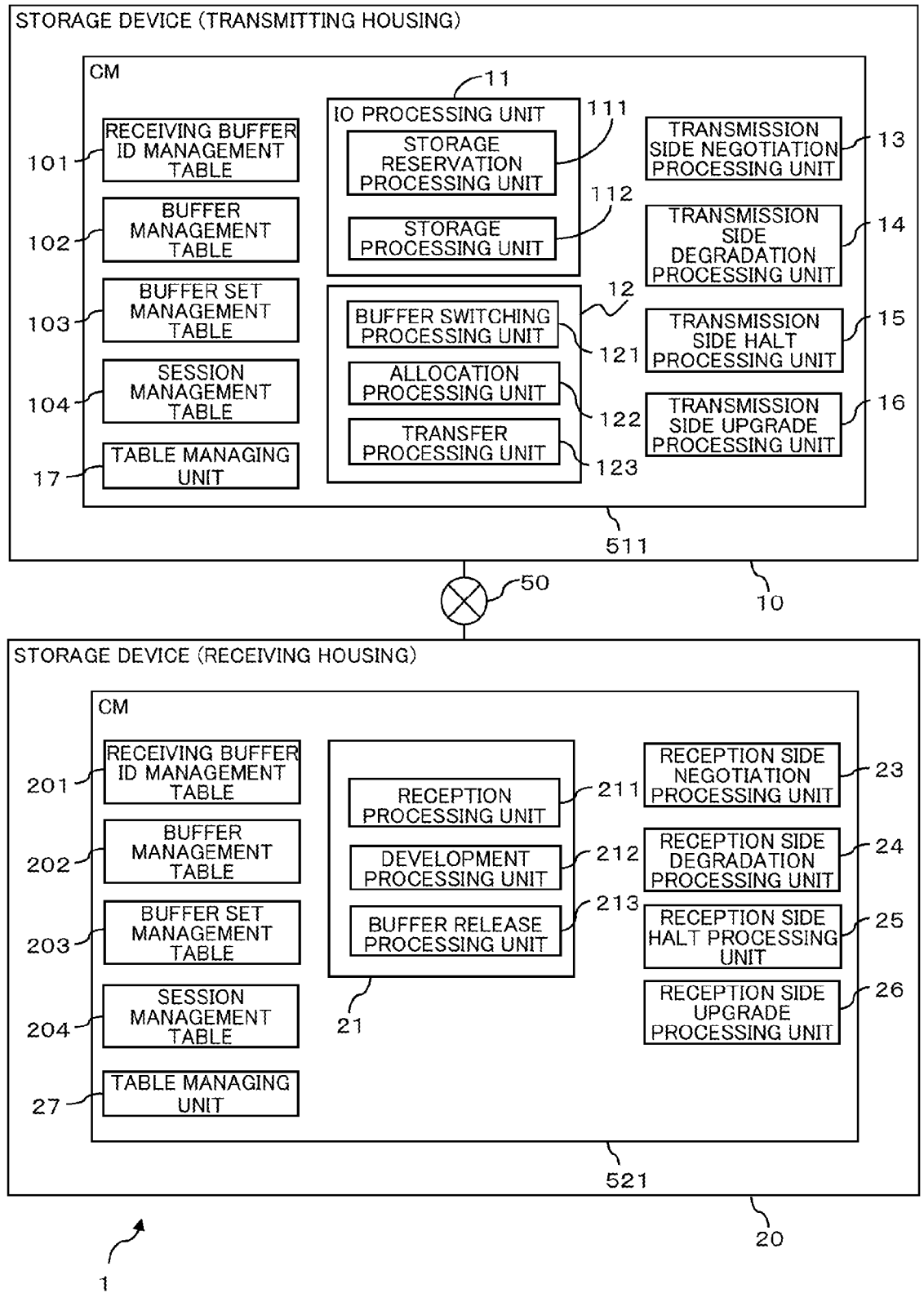
FIG. 2 is a diagram illustrating a functional configuration of a storage system according to an exemplary embodiment.
Figure 3:
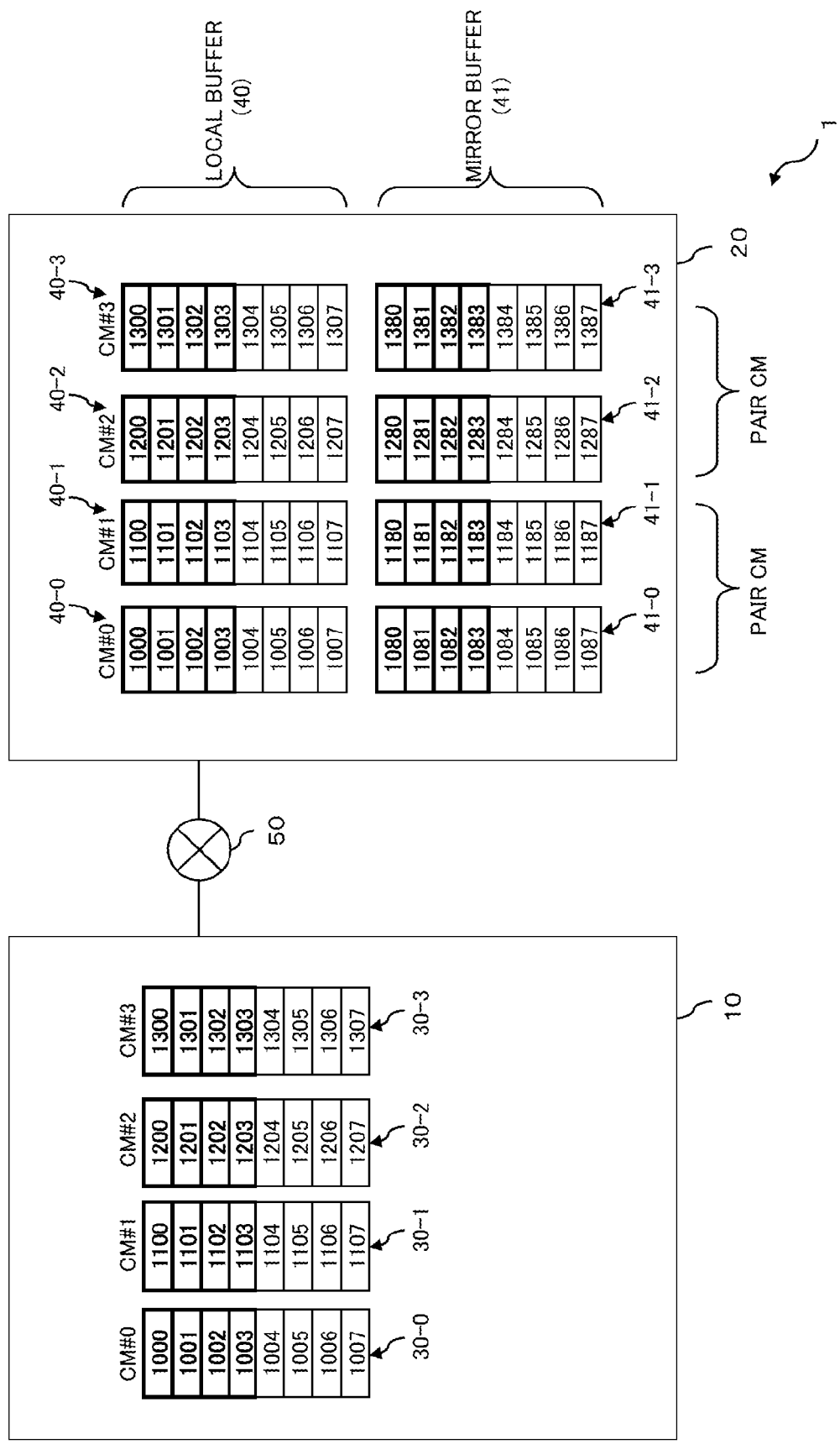
FIG. 3 is a diagram illustrating a buffer configuration in a storage system according to an exemplary embodiment.

FIG. 1 is a diagram illustrating a hardware configuration of a storage system 1 according to an exemplary embodiment, and FIG. 2 is a diagram illustrating a functional configuration of the storage system 1. FIG. 3 is a diagram illustrating a buffer configuration in the storage system 1 according to the exemplary embodiment.

The storage system 1 according to the exemplary embodiment is configured such that a plurality of storage devices (two storage devices 10 and 20 in the example illustrated in FIG. 1) are connected to perform communication with one another via a remote line (communication line) 50 as illustrated in FIG. 1. The storage devices 10 and 20 are arranged at geographically separated places.

The storage devices 10 and 20 include one or more CMs (information processing apparatus) 511-0 to 511-3 and 521-0 to 521-3 (four CMs in the present embodiment).

Further, in the example illustrated in FIG. 1, a host device 2 serving as a higher-level device is connected to the storage device 10, and a host device 3 serving as a higher-level device is connected to the storage device 20.

The host devices 2 and 3 write or read data to or from the volumes of the storage devices 10 and 20 connected thereto. For example, the host device 2 transmits a data access request for reading or writing to a copy source volume which is a business volume of the storage device 10. The storage device 10 performs data access to the copy source volume in response to the data access request, and transmits a response to the host device 2.

The host devices 2 and 3 are information processing apparatuses such as a computer including a central processing unit (CPU), a memory, and the like which are not illustrated.

The storage system 1 has a data migrating function of migrating (copying) data by transferring a copy of data of the volume (logical volume) of the storage device 10 to another storage device 20.

Here, the storage device 10 serves as a copy source housing (a migration source device), and the storage device 20 serves as a copy destination housing (a migration destination device). Next, data migration will be described in connection with an example in which a copy of data of a disk device 131 of the storage device (first storage device) 10 is transferred to the storage device (second storage device) 20 and is stored in a disk device 231 of the storage device 20.

Hereinafter, the storage device 10 may be referred to as a migration source device 10, and the storage device 20 may be referred to as a migration destination device 20. Further, hereinafter, data copying may be expressed as data migration.

Further, data transfer performed between the storage device 10 and the storage device 20 via a remote line 50 may be referred to as remote transfer.

The remote line 50 is a communication line connected so that data communication can be performed, and implements data transfer based on a standard such as TCP/IP.

The storage devices 10 and 20 provide a storage area to the host devices 2 and 3, and are, for example, an RAID device. For the sake of convenience, FIG. 1 illustrates a state in which the host device 2 is connected to the storage device 10, and the host device 3 is connected to the storage device 20, but each of the storage devices 10 and 20 may be connected to two or more host devices.

The storage device 10 includes the CMs 511-0 to 511-3 and a disk enclosure 130, and the storage device 20 includes the CMs 521-0 to 521-3 and a disk enclosure 230 as illustrated in FIG. 1.

The CMs 511-0 to 511-3 and the CMs 521-0 to 521-3 perform various kinds of control in the storage devices 10 and 20, and perform various kinds of control such as access control to the disk devices 131 and 231 of the disk enclosures 130 and 230 according to storage access requests (access control signals) from the host devices 2 and 3 serving as the higher-level device. The CMs 511-0 to 511-3 and the CMs 521-0 to 521-3 have the same hardware configuration.

Hereinafter, in the storage device 10, the CM 511-0 may be referred to as a CM #0, and similarly, the CMs 511-1, 511-2, and 511-3 may be referred to as CMs #1, #2, and #3, respectively. Further, in the storage device 20, the CM 521-0 may be referred to as a CM #0, and similarly, the CMs 521-1, 521-2, and 521-3 may be referred to as CMs #1, #2, and #3, respectively.

Further, hereinafter, in the storage device 10, as a reference numeral representing a CM, reference numerals 511-0 to 511-3 or #0 to #3 are used when it is necessary to specify one of a plurality of CMs, but a reference numeral 511 or simply a CM is used to denote an arbitrary CM. Similarly, in the storage device 20, as a reference numeral representing a CM, reference numerals 521-0 to 521-3 or #0 to #3 are used when it is necessary to specify one of a plurality of CMs, but an arbitrary CM is denoted by a reference numeral 521 or simply by a CM.

The disk enclosures 130 and 230 include one or more disk devices 131 and 231. The disk devices 131 and 231 are, for example, a HDD or a solid state drive (SSD). In the storage devices 10 and 20, storage areas of the HDDs 131 and 231 are allocated to the logical volumes.

The CMs 511 and 521 include channel adapters (CAs) 124 and 224, remote adapters (RAs) 125 and 225, CPUs 110 and 210, device adapters (DAs) 126 and 226, and memories 127 and 227 as illustrated in FIG. 1. Further, in the example illustrated in FIG. 1, the storage devices 10 and 20 include four CMs, that is, the CMs 511-0 to 511-3 and the CMs 521-0 to 521-3, but the present invention is not limited to this example. The number of CMs 511 and 521 may be 3 or less or 4 or more.

The CAs 124 and 224 are interface controllers connected so that communication with the host devices 2 and 3 can be performed such as a fiber channel.

Further, for example, when an operator inputs a data migration instruction to perform data migration from the storage device 10 to the storage device 20 through the host device 2, the CA 124 functions as a receiving unit that receives the data migration instruction.

The RAs 125 and 225 are interface controllers connected (remotely connected) so that communication with the other storage devices 20 and 10 can be performed via the remote line 50 such as a fiber channel.

The DAs 126 and 226 are interface controllers connected so that communication with the disk enclosures 130 and 230 can be performed such as a fiber channel.

The memories 127 and 227 are a storage device including a read only memory (ROM) and a random access memory (RAM). A software program related to copy control (remote transfer control) or a sort of data for the program is written in the ROMs of the memories 127 and 227. The software programs on the memories 127 and 227 are appropriately read and executed by the CPUs 110 and 210. Further, the RAMs of the memories 127 and 227 are used as a primary memory or a working memory.

Further, for example, data to be transmitted to the other storage devices 20 and 10 is temporarily stored in certain areas of the memories (RAMs) 127 and 227, and the memories 127 and 227 function as REC buffers (recording-dedicated buffers) 30-0 to 30-3, 40-0 to 40-3, and 41-0 to 41-3 (see FIG. 3). In other words, the memories 127 and 227 function as transfer data buffers that temporarily store data to be transferred to the other storage devices 20 and 10 at the time of remote transfer which will be described later.

As illustrated in FIG. 3, the REC buffers 30-0 to 30-3, 40-0 to 40-3, and 41-0 to 41-3 are divided into a plurality of areas (buffer areas or storage areas) and managed in order to guarantee the sequentiality of the data reading/writing process. The divided individual buffer areas are managed as generations. In the example illustrated in FIG. 3, each of the REC buffer 30-0 to 30-3, 40-0 to 40-3, 41-0 to 41-3 is divided into buffer areas of 8 generations of generations 1 to 8. The buffer areas of the generations are chronologically managed.

Further, the buffer areas are opened after the copy process between the storage devices 10 and 20 is completed. Here, "open" means that the buffer area is a data storable state.

In the storage device 10, the CM #0 is equipped with the REC buffer 30-0. Similarly, the CMs #1, #2, and #3 are equipped with the REC buffers 30-1, 30-2, and 30-3, respectively.

Further, hereinafter, in the storage device 10, as a reference numeral representing the REC buffer, reference numerals 30-0 to 30-3 are used when it is necessary to specify one of a plurality of REC buffers, but a reference numeral 30 is used to denote an arbitrary REC buffer.

Further, in the storage device 10, a buffer ID serving as unique identification information is set to each buffer area equipped in each REC buffer 30. In the example illustrated in FIG. 3, 8 buffer areas represented by buffer IDs 1000 to 1007 are formed in the REC buffer 30-0.

Similarly, 8 buffer areas represented by buffer IDs 1100 to 1107 are formed in the REC buffer 30-1, 8 buffer areas represented by buffer IDs 1200 to 1207 are formed in the REC buffer 30-2, and 8 buffer areas represented by buffer IDs 1300 to 1307 are formed in the REC buffer 30-3.

Further, in the REC buffers 30 of the CMs #0 to #3, buffer areas which are adjacent to one another in a horizontal direction in FIG. 3 are used as the same generation. For example, in the CMs #0, #1, #2, and #3, the buffer areas of the buffer IDs 1000, 1200, 1200, and 1300 are used as the same generation.

In the storage device 20, the CM #0 is equipped with the two REC buffers 40-0 and 41-0. Similarly, the CM #1 is equipped with the REC buffers 40-1 and 41-1, the CM #2 is equipped with the REC buffers 40-2 and 41-2, and the CM #3 is equipped with the REC buffers 40-3 and 41-3. Further, hereinafter, in the storage device 20, as a reference numeral representing the REC buffer, reference numerals 40-0 to 40-3 or 41-0 to 41-3 are used when it is necessary to specify one of a plurality of REC buffers, but a reference numeral 40 or 41 is used to denote an arbitrary REC buffer.

In the storage device 20, the REC buffer 40 corresponds to the REC buffer 30 of the storage device 10. In other words, the REC buffer 40-0 corresponds to the REC buffer 30-0, and the buffer areas formed in the REC buffer 40-0 are allocated the same buffer IDs as the buffer areas of the REC buffer 30-0. Further, in the REC consistency transfer, a copy of data of the REC buffer 30-0 of the storage device 10 is stored in the REC buffer 40-0 of the storage device 20.

Similarly, the buffer areas formed in the REC buffers 40-1, 40-2, and 40-3 are allocated the same buffer IDs as the buffer areas of the REC buffers 30-1, 30-2, and 30-3, respectively. Further, in the REC consistency transfer, copies of data of the REC buffer 30-1, 30-2, 30-3 of the storage device 10 are stored in the REC buffers 40-1, 40-2, and 40-3 of the storage device 20, respectively. The REC buffer 40 is referred to as a local buffer, and the REC buffer 40 may be hereinafter referred to as a local buffer 40.

In the storage device 20, the REC buffer 41 is equipped corresponding to the REC buffer 40, and has the same configuration as the REC buffer 40. Here, buffer IDs different from those of the REC buffer 40 are set to the buffer areas of the REC buffer 41.

For example, in the example illustrated in FIG. 3, 8 buffer areas represented by buffer IDs 1080 to 1087 are formed in the REC buffer 41-0.

Similarly, 8 buffer areas represented by buffer IDs 1180 to 1187 are formed in the REC buffer 41-1, 8 buffer areas represented by buffer IDs 1280 to 1287 are formed in the REC buffer 41-2, and 8 buffer areas represented by buffer IDs 1380 to 1387 are formed in the REC buffer 41-3.

The REC buffer 41 stores a copy of data to be stored in the REC buffer 40. The REC buffer 41 is referred to as a mirror buffer. Hereinafter, the REC buffer 41 may be referred to as a mirror buffer 41.

Note that in the storage system 1, a copy of the local buffer 40 of another CM is stored in the mirror buffer 41. Specifically, the mirror buffer 41 of each CM stores a copy of the local buffer 40 of another CM configuring a pair or a set with the corresponding CM.

Further, in the storage system 1, buffer areas of the respective CMs 511 belonging to the same generation are dealt with as a unit of a buffer set and collectively controlled.

For example, in the example illustrated in FIG. 3, buffers of the buffer ID 1000 of the CM #0, the buffer ID 1100 of the CM #1, the buffer ID 1200 of the CM #2, and the buffer ID 1300 of the CM #3 are buffer areas of the same generation, and configure the same buffer set. Similarly, in the example illustrated in FIG. 3, 8 buffer areas lined up in the horizontal direction on a paper plane in the storage devices 10 and 20 are buffer areas of the same generation, and configure the same buffer set.

Further, a buffer set ID used to uniquely specify a buffer set is set to each buffer set. In the example illustrated in FIG. 3, 8 buffer sets are illustrated, and integers of 0 to n (n=8) are used as the buffer set IDs.

Here, in the storage device 20, 2 CMs configure a pair (or a set). In the present embodiment, the CM #0 and the CM #1 configure a pair, and the CM #2 and the CM #3 configure a pair.

Further, the mirror buffer 41 of each CM stores a copy of data of the local buffer 40 of a CM configuring a part with the corresponding CM, and thus data of the local buffer 40 is redundantly stored.

In other words, in the storage device 20, redundancy is implemented by the local buffer 40 and the mirror buffer 41, and the local buffer 40 and the mirror buffer 41 configure a redundant receiving buffer.

Figure 4:
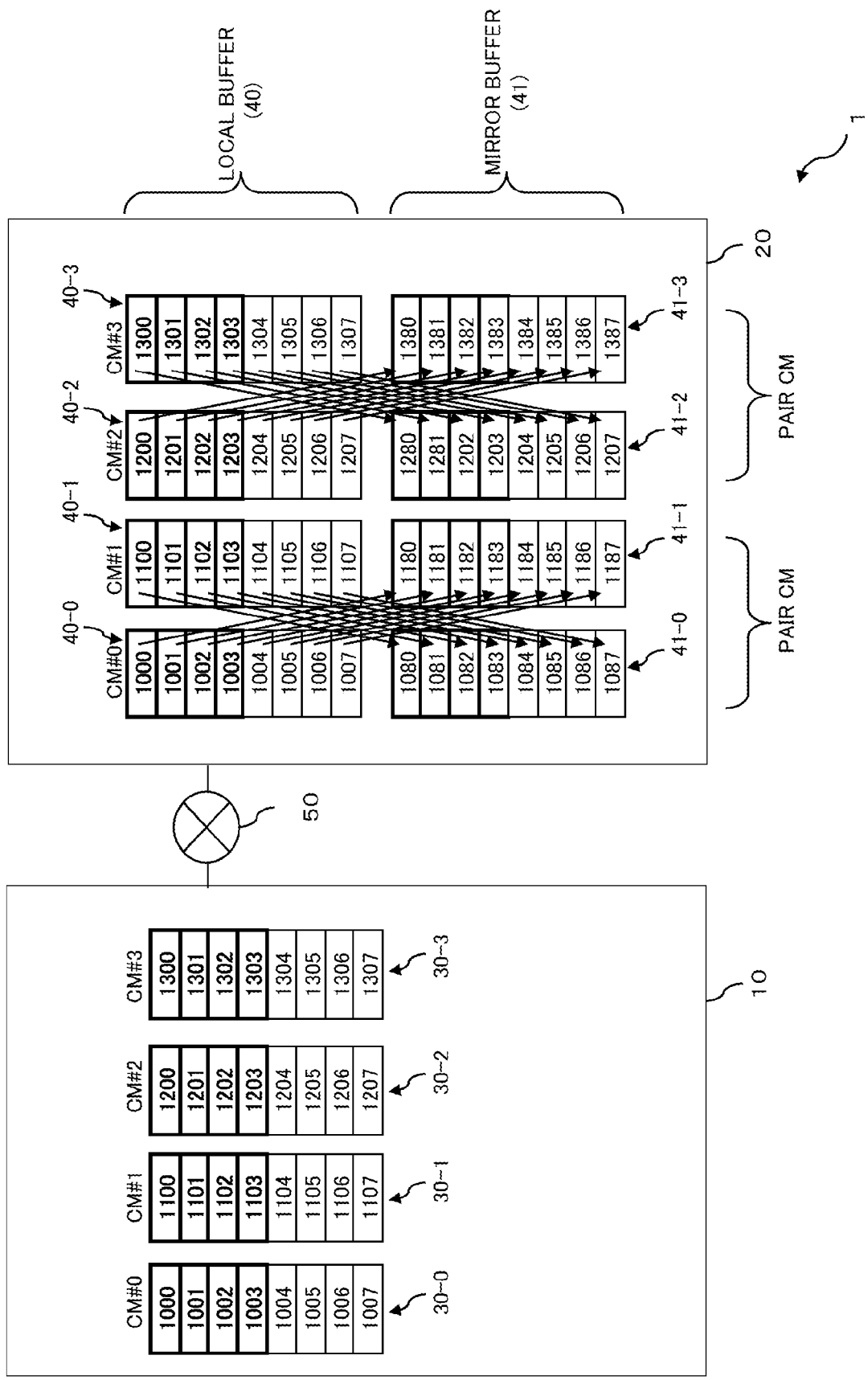
FIG. 4 is a diagram for describing a buffer redundancy technique in a storage device of a storage system according to an exemplary embodiment.

FIG. 4 is a diagram for describing a buffer redundancy technique in the storage device 20 of the storage system 1 according to the exemplary embodiment.

As indicated by arrows in FIG. 4, in the storage device 20, a copy of data of the local buffer 40-1 of the CM #1 is stored in the mirror buffer 41-0 of the CM #0. Similarly, a copy of data of the local buffer 40-0 of the CM #0 is stored in the mirror buffer 41-1 of the CM #1, and the local buffer 40-3 of the CM #3 is stored in the mirror buffer 41-2 of the CM #2. Further, a copy of data of the local buffer 40-2 of the CM #2 is stored in the mirror buffer 41-3 of the CM #3.

Hereinafter, a set of CMs (the CM #0 and the CM #1 or the CM #2 and the CM #3) configuring the pair may be referred to as a pair CM.

A data remote transfer technique using the REC buffers 30-0 to 30-3, 40-0 to 40-3, and 41-0 to 41-3 will be described later.

Further, data received from the host devices 2 and 3 or data to be transmitted to the host devices 2 and 3 is temporarily stored in other certain areas in the memories 127 and 227, and thus the memories 127 and 227 function as a buffer memory as well. Further, the memory 127 stores a copy bitmap (not illustrated) as well.

The copy bitmap is used to guarantee consistency of data at the storage device 10 side in a state in which it is difficult to guarantee a data update order by the REC buffers 30, 40, and 41. For example, an update data location or a data update location until a copy session recovery in the storage device 10 is recorded in the copy bitmap in the form of a differential bitmap.

Further, data or programs are temporarily stored in and developed into other certain areas in the memories 127 and 227 when he CPUs 110 and 210 execute the programs. Further, for example, a session mapping table or an REC buffer control table (not illustrated) which is usually used in the REC consistency transfer is also stored in another certain area in the memory 127.

Further, a receiving buffer ID management table 101, a buffer management table 102, a buffer set management table 103, and a session management table 104 which will be described later are stored in the RAM of the memory 127. A receiving buffer ID management table 201, a buffer management table 202, a buffer set management table 203, and a session management table 204 which will be described later are stored in the RAM of the memory 227.

Programs executed by the CPUs 110 and 210 or various kinds of data are stored in the ROMs of the memories 127 and 227.

The CPUs 110 and 210 are a processing apparatus that performs various kinds of control or operations, and implement various kinds of functions by executing the program stored in the memory 127 or the like.

Further, the CPU 110 of the storage device 10 function as an IO processing unit 11, a transmission side copy processing unit 12, a transmission side negotiation processing unit 13, a transmission side degradation processing unit 14, a transmission side halt processing unit 15, a transmission side upgrade processing unit 16, and a table managing unit 17 as illustrated in FIG. 2.

Further, the CPU 210 of the storage device 20 function as a reception side copy processing unit 21, a reception side negotiation processing unit 23, a reception side degradation processing unit 24, a reception side halt processing unit 25, a reception side upgrade processing unit 26, and a table managing unit 27 as illustrated in FIG. 2.

Further, a program implementing functions of the IO processing unit 11, the transmission side copy processing unit 12, the transmission side negotiation processing unit 13, the transmission side degradation processing unit 14, the transmission side halt processing unit 15, the transmission side upgrade processing unit 16, and the table managing unit 17 or a program implementing functions of the reception side copy processing unit 21, the reception side negotiation processing unit 23, the reception side degradation processing unit 24, the reception side halt processing unit 25, the reception side upgrade processing unit 26, and the table managing unit 27 is provided in a form recorded in a computer readable recording medium such as a flexible disk, a CD (for example, a CD-ROM, a CD-R, or a CD-RW), a DVD (for example, a DVD-ROM, a DVD-RAM, a DVD-R, a DVD+R, a DVD-RW, a DVD+RW, or a HD DVD), a Blu-ray disc, a magnetic disk, an optical disk, or a magneto optical disk. Further, a computer reads the program from the recording medium through a reading device (not illustrated), transfers the program to be stored in an internal storage device or an external storage device, and uses the program. Further, the program may be recorded in a storage device (recording medium) such as a magnetic disk, an optical disk, or a magneto optical disk, and then provided from the storage device to the computer via a communication path.

When the functions of the IO processing unit 11, the transmission side copy processing unit 12, the transmission side negotiation processing unit 13, the transmission side degradation processing unit 14, the transmission side halt processing unit 15, the transmission side upgrade processing unit 16, and the table managing unit 17 are implemented, the program stored in an internal storage device (the memory 127 in the present embodiment) is executed by a microprocessor (the CPU 110 in the present embodiment) of the computer. At this time, the computer may read and execute the program recorded in the recording medium.

Similarly, when the function of the reception side copy processing unit 21, the reception side negotiation processing unit 23, the reception side degradation processing unit 24, the reception side halt processing unit 25, the reception side upgrade processing unit 26 and the table managing unit 27 are implemented, the program stored in an internal storage device (the memory 227 in the present embodiment) is executed by a microprocessor (the CPU 210 in the present embodiment) of the computer. At this time, the computer may read and execute the program recorded in the recording medium.

(a) Storage Device 10

In the storage device 10, the CM 511 functions as the IO processing unit 11, the transmission side copy processing unit 12, the transmission side negotiation processing unit 13, the transmission side degradation processing unit 14, the transmission side halt processing unit 15, the transmission side upgrade processing unit 16, and the table managing unit 17. Further, the CM 511 is provided with the receiving buffer ID management table 101, the buffer management table 102, the buffer set management table 103, and the session management table 104. Further, in the example illustrated in FIG. 2, among a plurality of CMs 511 equipped in the storage device 10, only a single CM 511 functioning as a master is illustrated, and illustration of the other CMs 511 functioning as a slave is omitted. In other words, the functions of the IO processing unit 11, the transmission side copy processing unit 12, the transmission side negotiation processing unit 13, the transmission side degradation processing unit 14, the transmission side halt processing unit 15, the transmission side upgrade processing unit 16, and the table managing unit 17 are equipped in the master CM 511.

The IO processing unit 11 receives and processes data (writing data) transmitted from the host device 2. The IO processing unit 11 includes a storage reservation processing unit 111 and a storage processing unit 112.

The storage reservation processing unit 111 stores writing data transmitted from the host device 2 in the buffer memory, and performs preparation for storing the data in the REC buffer 30.

The storage processing unit 112 performs control of storing data in the REC buffer 30. When the REC buffer 30 becomes active, the storage processing unit 112 reads the writing data prepared by the storage reservation processing unit 111 from the buffer memory, and stores the writing data in the REC buffer 30.

The transmission side copy processing unit 12 performs a process of transferring a copy of data of the storage device 10 to the storage device 20 through the REC consistency transfer. The transmission side copy processing unit 12 control data transfer between the storage device 10 and the storage device 20. In the present embodiment, the transmission side copy processing unit 12 performs the data transfer from the storage device 10 to the storage device 20 using the REC consistency transfer.

The transmission side copy processing unit 12 includes a buffer switching processing unit 121, an allocation processing unit 122, and a transfer processing unit 123.

The buffer switching processing unit 121 performs switching between generations of the buffer areas in the REC consistency transfer. For example, the buffer switching processing unit 121 switches an active generation of the REC buffer 30 to the buffer areas of the next generation at intervals certain periods of time. Further, the buffer switching processing unit 121 switches an active generation of the REC buffer 30 to the buffer areas of the next generation when the memory size of areas of an active (latest) generation in the REC buffer 30 is exhausted in the storage device 10.

Further, the buffer area switching performed by the buffer switching processing unit 121 can be performed using various kinds of known techniques, and thus a detailed description thereof is omitted.

When data is transmitted to the storage device 20, the allocation processing unit 122 performs a process of allocating the reception side buffer ID with reference to the receiving buffer ID management table 101.

FIG. 5 is a diagram illustrating the receiving buffer ID management tables 101 and 201 in the storage system 1 according to the exemplary embodiment. In the example illustrated in FIG. 5, each of the buffer areas (the buffer IDs) of the REC buffer 40 equipped in the storage device 20 is associated with "allocated" or "unallocated" representing a usage state (available state). In other words, in the receiving buffer ID management tables 101, buffer IDs to which "unallocated" is set represent buffer areas which can be used by the storage device 20.

The allocation processing unit 122 selects a buffer ID to which "unallocated" is set in the receiving buffer ID management table 101, and allocates the selected buffer ID to data to be transmitted.

Further, a technique of allocating the buffer ID through the allocation processing unit 122 can be performed using various kinds of techniques, and thus a detailed description thereof is omitted.

Further, upon receiving the buffer ID (receiving buffer ID) of the released buffer area from a buffer release processing unit 213 of the storage device 20 together with a release notification, the allocation processing unit 122 sets "unallocated" to the buffer ID in the receiving buffer ID management table 101.

The transfer processing unit (the transfer continuation processing unit) 123 transmits data stored in the REC buffer 30 to the storage device 20. The transfer processing unit 123 transmits data to the storage device 20 together with the buffer ID allocated by the allocation processing unit 122. The transfer processing unit 123 performs data transfer in units of buffer areas (buffer sets) of the CMs 511 belonging to the same generation. In other words, the transfer processing unit 123 collectively transfers data of buffer areas configuring a buffer set to the storage device 20.

A data transfer technique by the transfer processing unit 123 can be performed using various kinds of techniques, and thus a detailed description thereof is omitted.

Further, the transfer processing unit 123 does not preform the data transfer when "halt" is set to the buffer management table 102 which will be described later as a state (buffer state) of a buffer of the storage device 20. A buffer state "halt" represents a state in which a buffer is unavailable and a sequentiality guarantee operation is not performed.

When the buffer state is the halt state, transfer of copy data is not performed between the storage devices 10 and 20, and sequentiality-guaranteed data storage is not performed.

When updating is performed on the storage device 10 from the host device 2 or the like, an update location is stored in a copy bitmap (not illustrated) associated with an REC session.

As information set as a buffer state, there are "active" and "buffering" apart from "halt". The buffer state "active" is a state in which a buffer is available and a sequentiality guarantee operation can be performed. In other words, the transfer processing unit 123 performs data transfer when "active" is set as the buffer state in the buffer management table 102.

The buffer state "active" represents a state in which the REC buffer 30 is available, and represents that copying can be performed between the storage devices 10 and 20 using the REC buffer 30.

When the buffer state is "active," sequentiality-guaranteed data storage is performed in the REC buffer 30 while performing sequentiality-guaranteed transfer between the storage device 10 and the storage device 20.

The buffer state of "halt" or "buffering" represents a state (a halt state) in which it is impossible to perform copying between the storage devices 10 and 20 using the REC buffer 30. In the halt state, the halt process is performed by the transmission side halt processing unit 15 or the reception side halt processing unit 25.

When the buffer state is "buffering," copy data of the REC buffer 30 is not transferred from the storage device 10 to the storage device 20, but data can be stored in the REC buffer 30. In other words, when updating is performed on the storage device 10 from the host device 2 or the like, updated data is stored in the REC buffer 30, and sequentiality guarantee is maintained.

In other words, it is a state in which transfer from the storage device 10 to the storage device 20 is not transferred, but sequentiality-guaranteed data storage is kept in the storage device 10 at the transmission side.

When the transfer is resumed between the storage devices 10 and 20 in a state in which buffering is being continued in a buffer on a memory or a disk buffer, the buffer state changes from "buffering" to "active," and sequentiality-guaranteed transfer is resumed between the storage devices 10 and 20 using the REC buffer 30.

When the buffer state changes from "halt" to "active" due to the transfer resumption, update difference data is transmitted from the storage device 10 to the storage device 20 according to the update location stored in the copy bitmap (differential bitmap copy). When the differential bitmap copy is completed, it becomes an (equivalent) state in which there is consistency between data of the storage device 10 and data of the storage device 20.

In other words, the copy session state transitions from "copying" to "equivalent," and thus sequentiality-guaranteed data transfer is resumed between the storage devices 10 and 20.

The transmission side negotiation processing unit 13 performs a negotiation process in the storage device 10.

For example, the negotiation is performed when the storage system 1 is activated, and a session is established by exchanging, for example, a parameter/key, an appropriate range value corresponding thereto, and the like as well as an authentication scheme. The transmission side negotiation processing unit 13 performs the negotiation with the reception side negotiation processing unit 23 of the storage device 20.

Further, the transmission side negotiation processing unit 13 initializes the buffer management table 102 or the buffer set management table 103 at the time of the negotiation process.

Further, a process at the time of negotiation in the storage system 1 will be described later with reference to FIG. 11.

The transmission side degradation processing unit 14 performs device degradation on the storage device 10. The degradation causes a device from which abnormality or the like is detected to enter a disable state (a saving state or a non-recognition state) and thus prevents the corresponding device from influencing the other portions of a system. A degradation technique can be performed using various kinds of techniques such as bus disconnection and interruption of power supply.

For example, when abnormality is detected in a certain CM in the storage device 10, the transmission side degradation processing unit 14 degrades the corresponding CM to enter the disable state.

For example, the transmission side degradation processing unit 14 performs the degradation by interrupting power supply to a target device or disconnecting a data bus to a target device. The degradation technique performed by the transmission side degradation processing unit 14 can be performed using various kinds of techniques, and thus a detailed description thereof is omitted.

The transmission side upgrade processing unit 16 recovers (upgrades) the device degraded by the transmission side degradation processing unit 14 in the storage device 10, and causes the device to enter an enable state. For example, when a certain CM is degraded and then a maintenance person replaces the degraded CM, the transmission side upgrade processing unit 16 upgrades the corresponding CM.

For example, the transmission side upgrade processing unit 16 performs the upgrade by recovering a power supply to an interrupted target device or connecting a data bus to an interrupted target device. The upgrade technique performed by the transmission side upgrade processing unit 16 can be performed using various kinds of techniques, and thus a detailed description thereof is omitted.

The transmission side halt processing unit (setting processing unit) 15 performs processing when a halt state in which processing in a system is suspended is detected in the storage device 20. When the halt state is detected in the storage device 20, the transmission side halt processing unit 15 stops data transfer to the storage device 20, and changes the buffer state in the buffer management table 102 to "buffering." Further, the transmission side halt processing unit 15 changes the copy session state (phase) in the session management table 104 from the "equivalent (consistency)" state to the "copying (inconsistency)" state.

Further, the transmission side halt processing unit 15 sets a "lost state" to the reception side buffer data lost state in the buffer management table 102.

Figure 16:
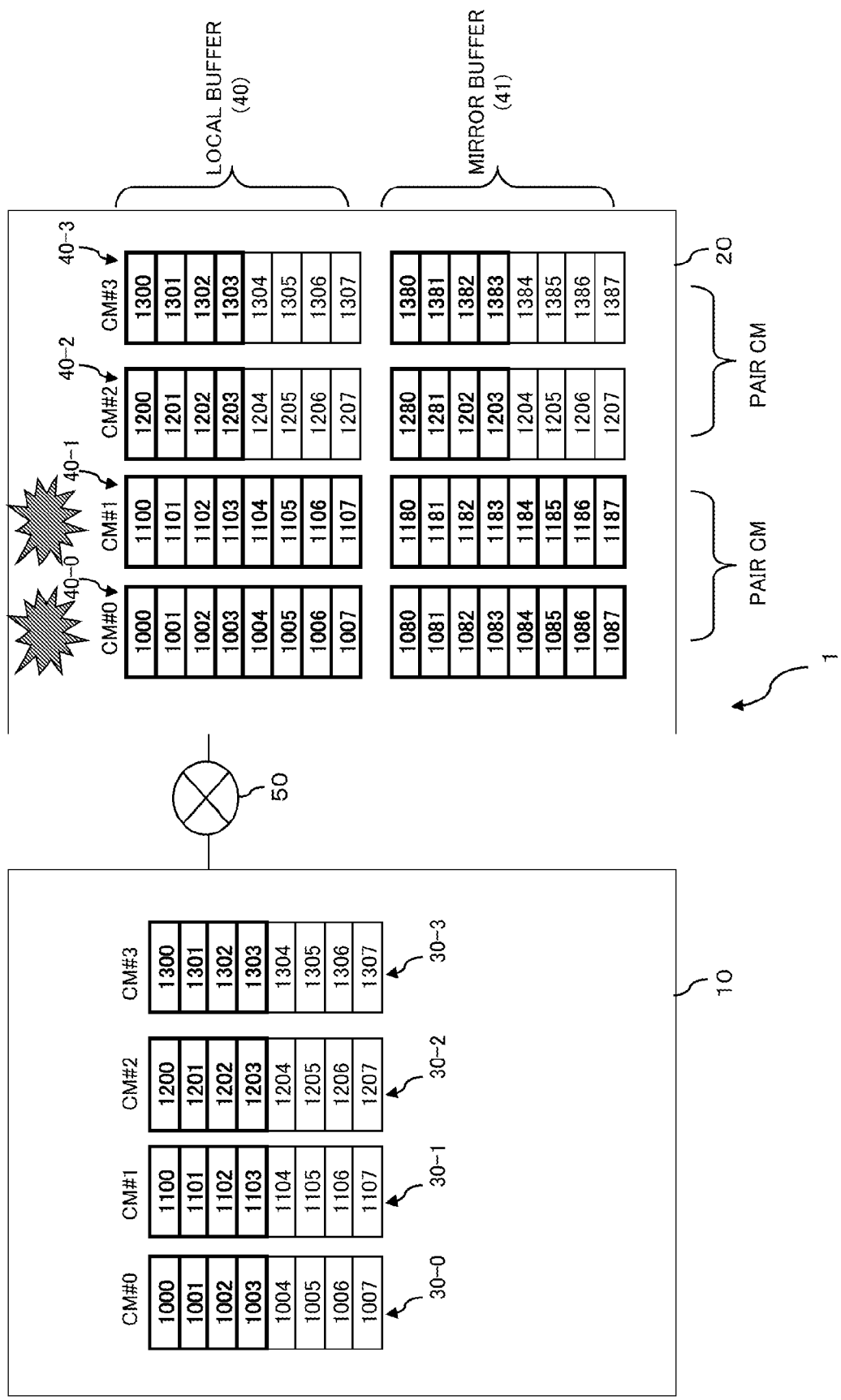
FIG. 16 is a diagram illustrating a state in which a halt state is detected in a storage device of a storage system according to an exemplary embodiment.

For example, FIG. 16 illustrates a state in which the CM #0 and the CM #1 configuring the pair CM have degraded together in the storage device 20. When two CMs configuring a pair CM simultaneously degrade as described above (which may be hereinafter referred to as pair degradation"), all data of the local buffer 40 and the mirror buffer 41 of the CMs #0 and #1 are lost.

In the storage system 1, when two CMs configuring a pair CM simultaneously degrade as described above, switching to the halt state is performed without entering the error suspension state, leading to a negotiation inhibition state.

The table managing unit (a transfer continuation processing unit, a session managing unit, and a buffer managing unit) 17 manages the receiving buffer ID management table 101, the buffer management table 102, the buffer set management table 103, and the session management table 104, and for example, changes setting values of the tables.

Further, the table managing unit 17 (the session managing unit) performs the following process when the "lost state" is determined to be set to the reception side buffer data lost state with reference to the reception side buffer data lost state of the buffer management table 102 which will be described later.

In other words, the copy session state (phase) in the session management table 104 which will be described later is changed from "copying (inconsistency)" to "equivalent (consistency)." As described above, the table managing unit 17 manages the copy session state, for example, by changing the setting of the session management table 104.

Further, the table managing unit (the buffer managing unit) 17 changes the reception side buffer data lost state in the buffer management table 102 which will be described later from "lost state" to "non-lost state." As a result, the sequentiality-guaranteed data transfer from the storage device 10 to the storage device 20 is continuously performed. As described above, the table managing unit 17 manages the buffer data lost stat, for example, by changing the setting of the buffer management table 102.

The buffer management table 102 manages information related to the REC buffer 30 in the storage device 10 in the form of a table. Further, the buffer management table 202 having the same configuration as the buffer management table 102 is stored in the storage device 20 as well.

FIG. 6 is a diagram illustrating the buffer management tables 102 and 202 according to an exemplary embodiment. The buffer management tables 102 and 202 include information (a transmitting buffer size, 1 CM 1 buffer size, a buffer list size, a total buffer size per CM, the number of transmitting buffer sets) related to the buffer area size and information (a buffer state, a negotiation state, a reception side buffer data lost state, a buffer set ID being subjected to a development process, and a usage state of each buffer set) representing a usage state of the REC buffer 40 as illustrated in FIG. 6.

Further, "transmitting housing" is set as an attribute in the buffer management table 102 equipped in the storage device 10, and "receiving housing" is set as an attribute in the buffer management table 202 equipped in the storage device 20.

Any one state of "active," "halt," and "buffering" described above is stored as the buffer state.

Further, the reception side buffer data lost state represents whether the REC buffer 30 at the reception side is in the lost state, and either state of "it is in lost state" and ""non-lost state"" is stored. For example, a setting representing "it is in lost state" or ""non-lost state"" in the reception side buffer data lost state is performed using a flag or the like.

Further, other information than the reception side buffer data lost state in the buffer management tables 102 and 202 is the same as in a known buffer management table, and thus a description thereof is omitted.

The buffer set management table 103 manages information related to each buffer set in the form of a table.

FIG. 7 is a diagram illustrating the buffer set management table 103 according to an exemplary embodiment.

In the buffer set management table 103, a buffer set link Prev and a buffer set link Next are registered for each buffer set, that is, in associated with a buffer set ID.

Here, the buffer set link Prev is a buffer set ID of a buffer set of an immediately previous generation. Further, in the example illustrated in FIG. 7, since a buffer set having a buffer set ID of 0 is the head (the oldest generation), "0xffff" is set for the sake of convenience. The buffer set link Next is a buffer set ID of a buffer set of an immediately next generation.

Further, the buffer set management table 103 manages states of buffer areas configuring a buffer set.

In other words, a buffer transmission state and a buffer set management table reception state are registered in association with buffer IDs (a transmitting buffer ID and a receiving buffer ID) of buffer areas configuring a buffer set. "Being transmitted" or "transmitted" is set as the buffer transmission state and the buffer set management table reception state.

For example, the buffer set management table 103 is updated at a timing at which data is stored in a buffer area, or at a timing such as a timing at which data is transmitted, a timing at which data transmission is completed, a timing at which a buffer set is released when transmitting and receiving buffers are bound by the storage device 10 (the transmission side) and the storage device 20 (the reception side).

In the case in which pair degradation occurs in the storage device 20 during the sequentiality-guaranteed data transfer between the storage devices 10 and 20 and thus the copy session is suspended, when the copy session state transitions from "copying" to "equivalent" and thus the transfer is resumed as will be described later, the storage device 10 of the copy source can copy a lastly executed buffer set again with reference to the buffer set management table 103.

The session management table 104 is a table used to manage the copy session state between the storage device 10 and the storage device 20, and "copying (inconsistency)" or "equivalent (consistency)" is set for each copy session. Further, the session management table 204 having the same configuration as the session management table 104 is stored even in the storage device 20.

(b) Storage Device 20

In the storage device 20, the CM 521 functions as the reception side copy processing unit 21, the reception side negotiation processing unit 23, the reception side degradation processing unit 24, the reception side halt processing unit 25, the reception side upgrade processing unit 26, and the table managing unit 27. Further, the CM 521 is equipped with the receiving buffer ID management table 201, the buffer management table 202, the buffer set management table 203, and the session management table 204. Further, in the example illustrated in FIG. 2, among a plurality of CMs 521 equipped in the storage device 20, only a single CM 521 functioning as a master is illustrated, and illustration of the other CMs 521 functioning as a slave is omitted. In other words, the functions of the reception side copy processing unit 21, the reception side negotiation processing unit 23, the reception side degra-dation processing unit 24, the reception side halt processing unit 25, the reception side upgrade processing unit 26, and the table managing unit 27 are equipped in the master CM 521.

The reception side copy processing unit 21 performs a process of receiving a copy of data transferred from the storage device 10 to the storage device 20 through the REC consistency transfer. The reception side copy processing unit 21 control data transfer between the storage device 10 and the storage device 20.

The reception side copy processing unit 21 includes a reception processing unit 211, a development processing unit 212, and the buffer release processing unit 213.

The reception processing unit 211 receives data of a buffer set transmitted from the storage device 10. Further, the reception processing unit 211 stores the received data configuring the buffer set in the buffer areas of the corresponding local buffer 40 with reference to the receiving buffer ID attached to the received data. Further, the reception processing unit 211 transfers a copy of each received data even to the mirror buffer 41, and stores the copy in the buffer areas of the corresponding mirror buffer 41.

When the reception processing unit 211 completes reception of all data of the buffer set transmitted from the storage device 10, the development processing unit 212 collectively develops the data of the buffer set in the REC buffer (the local buffer 40 and the mirror buffer 41) into the disk device (storage medium) 231 of a copy destination. The development processing unit 212 develops the data received from the storage device 10 in units of buffer sets.

When e development processing unit 212 completes data development, the buffer release processing unit 213 releases the local buffer 40 and the mirror buffer 41 used for data storage. Here, the buffer release refers to an operation of causing a state in which new data is storable. Further, the buffer release processing unit 213 notifies the storage device 10 of a receiving buffer ID of a buffer area which is to be released (to enter a receivable state).

Figure 8:
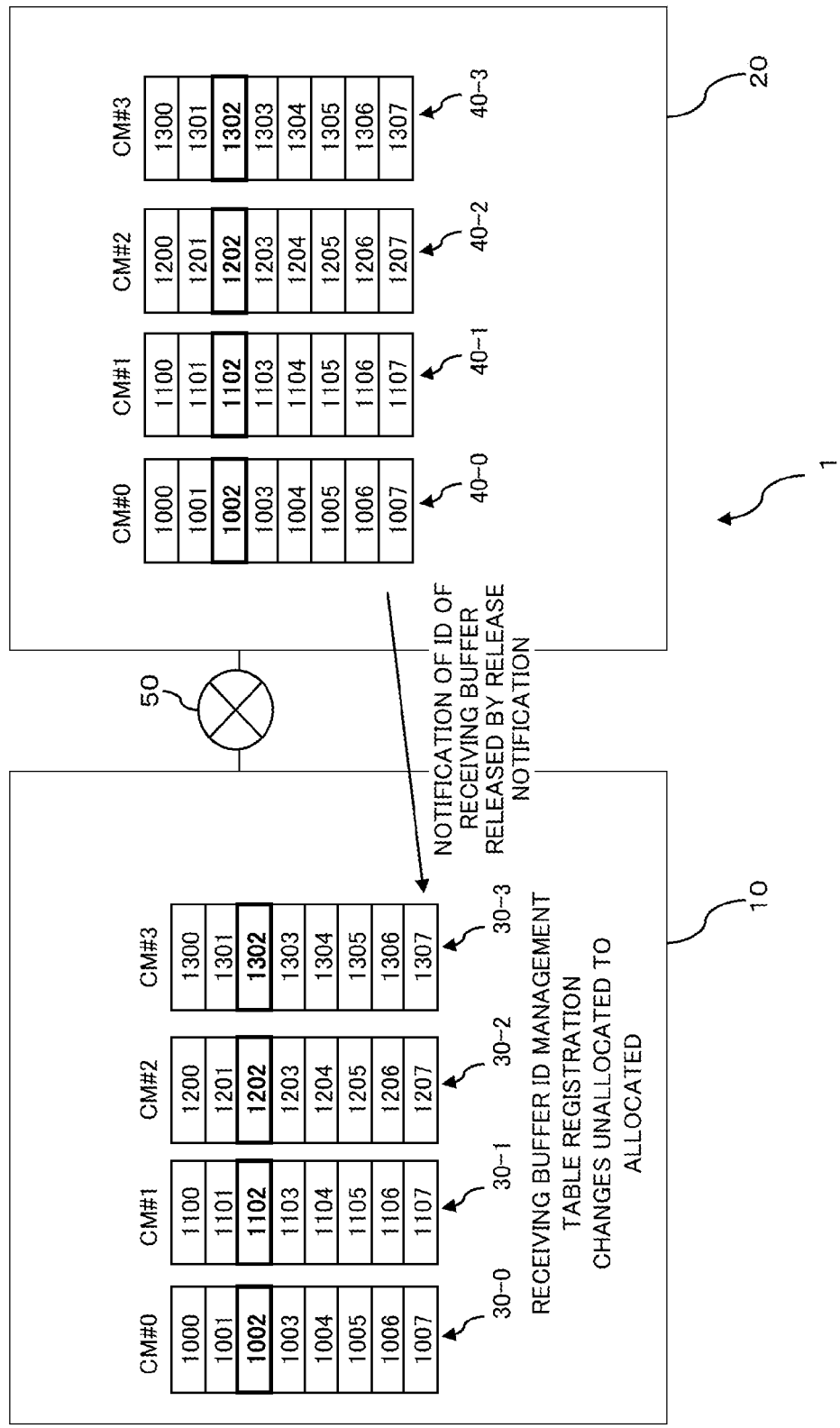
FIG. 8 is a diagram illustrating a buffer release process in a storage system according to an exemplary embodiment.

FIG. 8 is a diagram illustrating a buffer release process in the storage system 1 according to an exemplary embodiment, and corresponds to the receiving buffer ID management tables 101 and 201 illustrated in FIG. 5.

The example illustrated in FIG. 8 illustrates a state in which development of data of the buffer set including the buffer IDs 1002, 1102, 1202, and 1302 of the CMs #0 to #3 from the storage device 10 to the storage device 20 is completed. Further, the transfer of data of the buffer set of the buffer IDs 1003, 1004, 1103, 1104, 1203, 1204, 1303, and 1304 is also completed. Here, since the buffer areas of the buffer IDs 1003, 1004, 1103, 1104, 1203, 1204, 1303, and 1304 are not released by the buffer release processing unit 213, the buffer IDs are in the "allocated" state. Further, the remaining buffer areas are in the "unallocated" state. For the sake of convenience, illustration of the mirror buffer 41 and the like is omitted in FIG. 8.

When the development processing unit 212 completes the development process on the data of the buffer set including the buffer IDs 1002, 1102, 1202, and 1302, the buffer release processing unit 213 notifies the storage device 10 of the buffer IDs (the receiving buffer IDs) of the released buffer areas through a buffer release notification. In other words, in the storage system 1, the buffer release processing unit 213 transmits the notification of the buffer IDs (the receiving buffer IDs) of the released buffer areas and the release notification to the storage device 10 through single communication.

Specifically, the buffer release processing unit 213 includes the receiving buffer ID in the release notification to be transmitted, and transmits the release notification to the storage device 10 so that the buffer set is released. In other words, instead of being on standby for a response to the release notification and notifying of the receiving buffer ID as in the technique of the related art, the receiving buffer ID (the available buffer notification) is transmitted together with the release notification without waiting for the response to the release notification.

Upon receiving a response (an available buffer notification response) to the available buffer notification from the storage device 10, the buffer release processing unit 213 performs reception side buffer set release.

Through this operation, it is possible to transmit the available buffer notification from the storage device 20 to the storage device 10 in a short period of time, and it is possible to reduce the number of communications. Thus, it is possible to improve transfer efficiency and effectively use the network 50.

The reception side negotiation processing unit 23 performs the negotiation process in the storage device 20.

The reception side negotiation processing unit 23 performs the negotiation process when at least one of a pair of CMs has been upgraded and thus is in the enable state, but does not perform the negotiation process when both of a pair of CMs have degraded.

The reception side negotiation processing unit 23 initializes the buffer management table 202 or the buffer set management table 203 at the time of the negotiation process. Further, at the time of the negotiation process, the reception side negotiation processing unit 23 notifies the storage device 10 of a buffer ID of an available receiving buffer.

Further, the process at the time of negotiation in the storage system 1 will be described later with reference to FIG. 11.

The reception side degradation processing unit 24 performs device degradation in the storage device 20. For example, in the storage device 20, when abnormality is detected in a certain CM, the reception side degradation processing unit 24 degrades the corresponding CM and causes the corresponding CM to enter the disable state. Further, the degradation technique performed by the reception side degradation processing unit 24 can be performed using various kinds of techniques, similarly to the transmission side degradation processing unit 14, and thus a detailed description thereof is omitted.

In the storage device 20, the reception side upgrade processing unit 26 recovers (upgrades) the device degraded by the reception side degradation processing unit 24, and causes the corresponding device to enter the enable state. For example, when a certain CM is degraded and then a maintenance person replaces the degraded CM, the reception side upgrade processing unit 26 upgrades the corresponding CM.

For example, the reception side upgrade processing unit 26 performs the upgrade by recovering a power supply to an interrupted target device or connecting a data bus to a disconnected target device. Further, the upgrade technique performed by the reception side upgrade processing unit 26 can be also performed using various kinds of techniques, similarly to the transmission side upgrade processing unit 16, and thus a detailed description thereof is omitted.

The reception side halt processing unit 25 performs processing when the halt state in which processing in a system is suspended is detected in the storage device 20. In the case in which the halt state is detected, when a halt factor is degradation of a pair CM and the halt is caused while the development process is being performed, the reception side halt processing unit 25 performs a process of changing the copy session state (phase) in the session management table 204 from "equivalent (consistency)" to "copying (inconsistency)." Further, the reception side halt processing unit 25 sets "lost state" to the reception side buffer data lost state in the buffer management table 202.

Meanwhile, when a halt factor is not degradation of a pair CM or when the development process is not being performed, the reception side halt processing unit 25 suppresses halt detection (on standby for halt detection). For example, when the halt state occurs as the buffer of the storage device 10 is exhausted, the reception side halt processing unit 25 recognizes that the halt state has not occurred.

In other words, when either of a pair of CMs is operable, the reception side halt processing unit 25 is on standby for detection of the halt state. Even when a halt factor was a pair CM, if it has not occurred during the development process, the reception side halt processing unit 25 is on standby for detection of the halt state.

The table managing unit (the transfer continuation processing unit) 27 manages the receiving buffer ID management table 201, the buffer management table 202, the buffer set management table 203, and the session management table 204, and for example, changes setting values of the tables.

Further, the table managing unit 27 performs the following process when the "lost state" is determined to be set to the reception side buffer data lost state with reference to the reception side buffer data lost state of the buffer management table 202.

In other words, the copy session state (phase) in the session management table 204 is changed from "copying (inconsistency)" to "equivalent (consistency)." Further, the reception side buffer data lost state in the buffer management table 202 is changed from "lost state" to "non-lost state." As a result, the sequentiality-guaranteed data transfer is continuously performed between the storage device 10 and the storage device 20.

The buffer set management table 203 manages information related to each buffer set in the form of a table.

FIG. 9 is a diagram illustrating the buffer set management table 203 according to an exemplary embodiment.

In the buffer set management table 203, a buffer set link Prev and a buffer set link Next are registered for each buffer set, that is, in associated with a buffer set ID, similarly to the buffer set management table 103.

Further, the buffer set management table 203 manages states of buffer areas configuring a buffer set.

In other words, a buffer reception state, a buffer set management table reception state, and a receivable/unreceivable state are registered in association with buffer IDs (a transmitting buffer ID and a receiving buffer ID) of buffer areas configuring a buffer set. "Being transmitted" or "transmitted" is set as the buffer reception state and the buffer set management table reception state. Further, one of "unreceivable by mirror," "unreceivable by local," "unreceivable," and "receivable" is sets as the receivable/unreceivable state. In other words, information representing whether each buffer area in the local buffer 40 in the storage device 10 or a mirror area thereof in the mirror buffer 41 in a receivable state is set.

For example, in the storage device 10 illustrated in FIG. 3, when the CM #1 is degraded, the CM #0 performs reception through only the local buffer 40, the CM #1 does not use the local buffer 40, and the mirror buffer 41 of the CM #0 performs reception instead of the local buffer 40 of the CM #1.

At this time, the buffer areas of the receiving buffer IDs "0x10xx" enters the state of "unreceivable by mirror," and the buffer areas of the receiving buffer IDs "0x11xx" enters the state of "unreceivable by local." Further, "x" in the buffer ID represents a variable (for example, an integer of 0 to 3).

Here, when both the CM #0 and the CM #1 are degraded, the buffer areas of the receiving buffer IDs "0x10xx" and "0x11xx" enter the state of "unreceivable by local/mirror," that is, the "unreceivable" state.

For example, the buffer set management table 203 is updated at a timing such as a timing at which data is received, a timing at which data is developed, or a timing at which a buffer set is released.

(B) Operation

A first negotiation process in the storage system 1 according to the exemplary embodiment will be described according to a flowchart (steps A1 to A9) illustrated in FIG. 10 with reference to FIG. 11. FIG. 11 is a diagram illustrating the receiving buffer ID management tables 101 and 201 immediately after first negotiation in the storage system 1 according to the exemplary embodiment.

In the storage device 10, the transmission side negotiation processing unit 13 checks whether negotiation has been performed (step A1). When it is determined that the negotiation has already been performed (see a YES route of step A1), and the process ends.

When it is determined that the negotiation has not been performed (see a NO route of step A1), the transmission side negotiation processing unit 13 gives a notification (an initial notification) to the reception side negotiation processing unit 23 of the storage device 20 (step A2).

The reception side negotiation processing unit 23 checks whether at least one of a pair of CMs has been upgraded for each pair CM (step A3). When both of CMs configuring a pair CM have been degraded (see a NO route of step A3), the process proceeds to step A8.

When at least one of CMs configuring a pair CM has been upgraded, that is, normally operates (see a YES route of step A3), the reception side negotiation processing unit 23 initializes the buffer management table 202 (step A4). Here, in the case of the negotiation performed in the halt process occurring due to buffer exhaustion, a process of erasing the reception side buffer data lost state is performed. Specifically, the table managing unit 27 sets the reception side buffer data lost state in the buffer management table 202 to "non-lost state."

The reception side negotiation processing unit 23 initializes the buffer set management table 203 (step A5). Further, the reception side negotiation processing unit 23 notifies the storage device 10 of a buffer ID of an available receiving buffer (step A6). Through this operation, in the receiving buffer ID management tables 101 and 201, "unallocated" is set to each buffer ID as illustrated in FIG. 11. Further, the reception side negotiation processing unit 23 sets "negotiation process completion" to the negotiation state of the buffer management table 202.

In the storage device 10, the transmission side negotiation processing unit 13 initializes the buffer management table 102 and the buffer set management table 103 (step A7).

Here, in the case of the negotiation performed in the halt process occurring due to buffer exhaustion, a process of erasing the reception side buffer data lost state is performed. Specifically, the table managing unit 17 sets the reception side buffer data lost state in the buffer management table 102 to "non-lost state."

The transmission side negotiation processing unit 13 sets "negotiation process completion" to the negotiation state of the buffer management table 102 (step A8).

Figure 12:
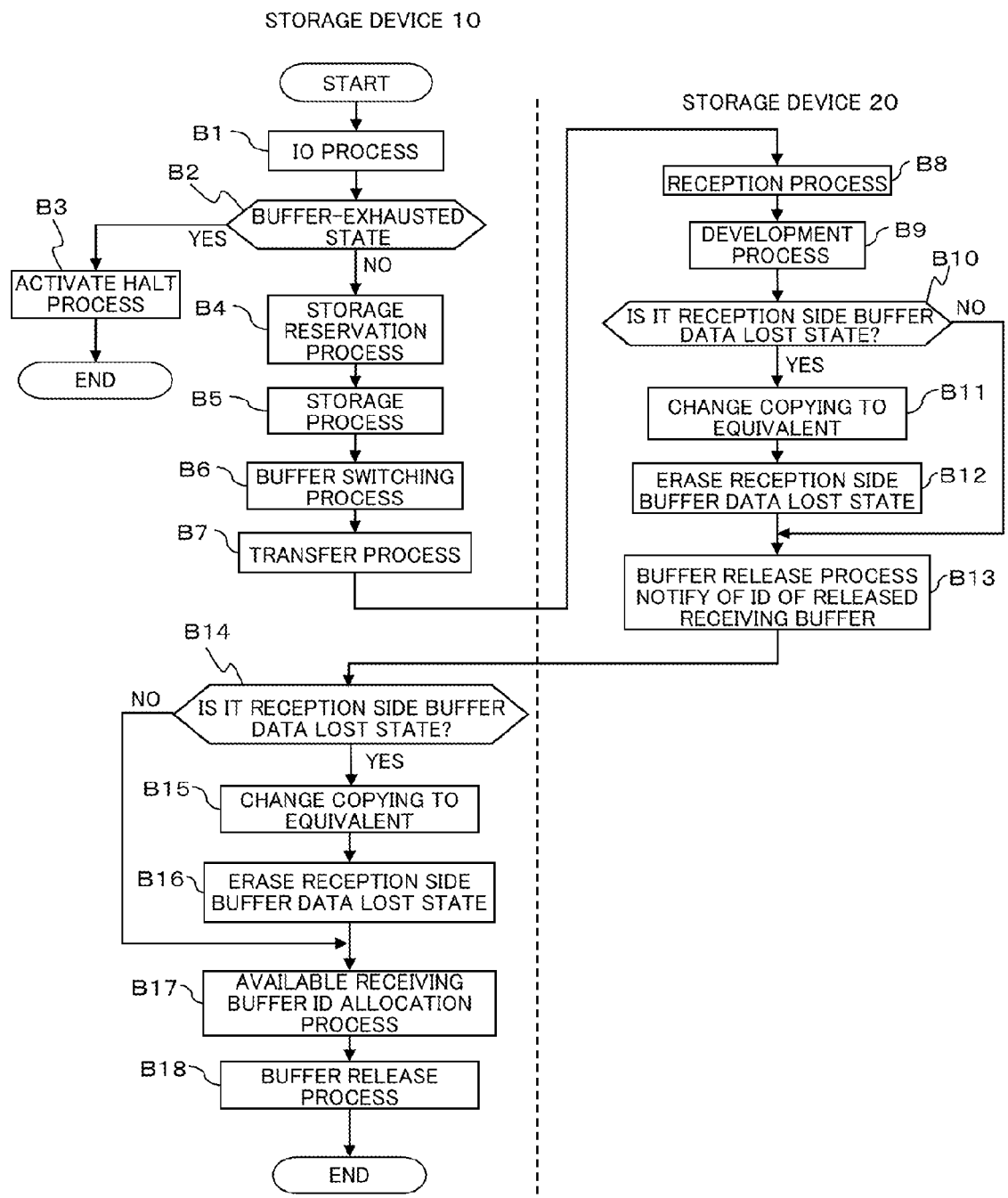
FIG. 12 is a flowchart for describing an REC consistency transfer process in a storage system according to an exemplary embodiment.

Further, when the copy session state transitions from "copying" to "equivalent" in the session management table 104, the sequentiality-guaranteed data transfer can be resumed between the storage devices 10 and 20. Through this operation, the REC consistency transfer (sequentiality-guaranteed data transfer) illustrated in FIG. 12 is resumed between the storage devices 10 and 20 (step A9), and the process ends. Further, "active" is set to the buffer states of the buffer management tables 102 and 202.

As described above, when the negotiation process is completed, "negotiated" is set to the negotiation states of the buffer management tables 102 and 202, and "active" is sets to the buffer states, buffering on the REC buffers 30, 40, and 41 can be performed. In other words, the storage device 10 enters a state in which it is possible to receive an I/O process from the host device 2.

Next, the REC consistency transfer process in the storage system 1 according to the exemplary embodiment will be described with reference to a flowchart (steps B1 to B18) illustrated in FIG. 12.

When the host device 2 performs the writing process on the storage device 10, the storage device 10 receives the I/O process (step B1).

Here, it is checked whether the REC buffer 30 is in an exhausted state (step B2), and when the REC buffer 30 is determined to be in the exhausted state (see a YES route of step B2), the halt process is activated (step B3), and the process ends. Further, the halt process which will be described later with reference to FIGS. 15 and 16.

When it is determined that the REC buffer 30 has not been exhausted (see a NO route of step B2), the storage reservation processing unit 111 stores writing data transmitted from the host device 2 in the buffer memory, and performs preparation for storage in the REC buffer 30 (step B4).

The storage processing unit 112 performs control of storing data in the REC buffer 30 (step B5).

For example, when a certain period of time elapses after data is stored in the buffer areas of the REC buffer 30 or when the free space of the buffer areas of data of an active generation is exhausted, the buffer switching processing unit 121 switches the active generation of the REC buffer 30 to buffer areas of the next generation (step B6).

Thereafter, the allocation processing unit 122 allocates the reception side buffer ID with reference to the receiving buffer ID management table 101, and the transfer processing unit 123 transmits data of the buffer set to the storage device 20 together with the buffer ID allocated by the allocation processing unit 122 (step B7). The transfer processing unit 123 performs data transfer when "active" is set to the buffer state.

In the storage device 20, the reception processing unit 211 receives the data of the buffer set transmitted from the storage device 10 (step B8), and stores the data in the local buffer 40 and the mirror buffer 41. The development processing unit 212 develops the data of the local buffer 40 or the mirror buffer 41 into the disk device 231 (step B9).

The table managing unit 27 checks whether it is the lost state with reference to the reception side buffer data lost state of the buffer management table 202 (step B10). When "lost state" is determined to be set to the reception side buffer data lost state (see a YES route of step B10), the table managing unit 27 changes the copy session state (phase) in the session management table 204 from "copying (inconsistency)" to "equivalent (consistency)" (step B11). When the copy session state transitions from "copying" to "equivalent," sequentiality-guaranteed data transfer can be resumed between the storage devices 10 and 20.

Further, the table managing unit 27 sets the reception side buffer data lost state in the buffer management table 202 to "non-lost state" (step B12). In other words, the reception side buffer data lost state is erased. The buffer release processing unit 213 releases the local buffer 40 and the mirror buffer 41 used for data storage (step B13). Further, the buffer release processing unit 213 notifies the storage device 10 of the buffer IDs (the receiving buffer IDs) of the released buffer areas through the buffer release notification. However, when "lost state" is determined to be not set to the reception side buffer data lost state (see a NO route of step B10), steps B11 and B12 are skipped, and the process proceeds to step B13.

In the storage device 10, the table managing unit 17 checks whether it is the lost state with reference to the reception side buffer data lost state of the buffer management table 102 (step B14). When "lost state" is determined to be set to the reception side buffer data lost state (see a YES route of step B14), the table managing unit 27 changes the copy session state (phase) in the session management table 104 from "copying (inconsistency)" to "equivalent (consistency)" (step B15). When the copy session state transitions from "copying" to "equivalent" in both the storage device 10 and the storage device 20, the sequentiality-guaranteed data transfer is resumed between the storage devices 10 and 20.

Further, the table managing unit 17 sets the reception side buffer data lost state in the buffer management table 102 to "non-lost state" (step B16). In other words, the reception side buffer data lost state is erased.

The allocation processing unit 122 performs a process of allocating an available receiving buffer ID with reference to the receiving buffer ID management table 101 (step B17). Further, when "lost state" is determined to be not set to the reception side buffer data lost state (see a NO route of step B14), steps B15 and B16 are skipped, and the process proceeds to step B17. Thereafter, the buffer release process is performed (step B18), and the process ends.

In the flowchart illustrated in FIG. 12, the transfer process of step B7 is performed after the IO process is performed in step B1, but the IO process and the transfer process are not performed in synchronization with each other. In other words, the process subsequent to step B7 is performed when the REC buffers 40 and 41 are in the receivable state.

Figure 13:
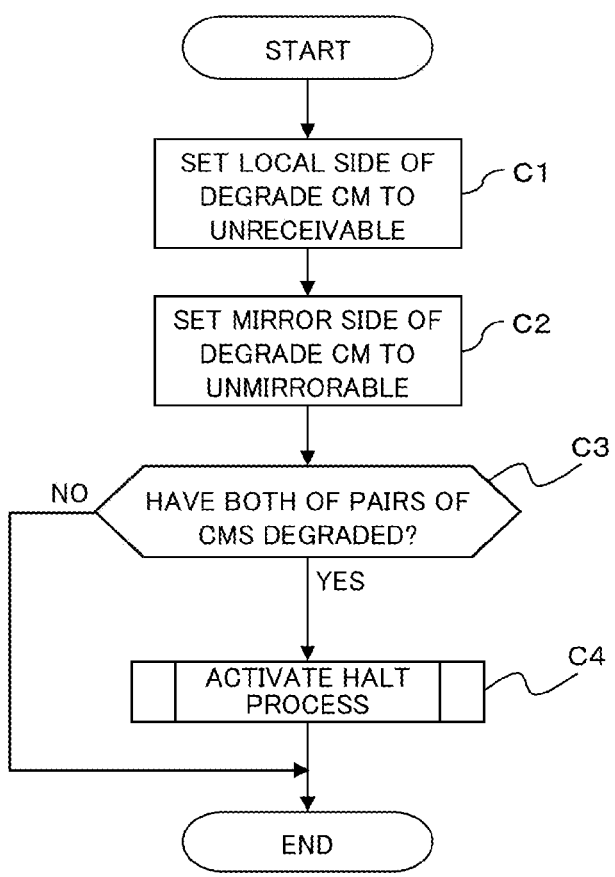
FIG. 13 is a flowchart for describing a degradation process in a storage system according to an exemplary embodiment.
Figure 14:
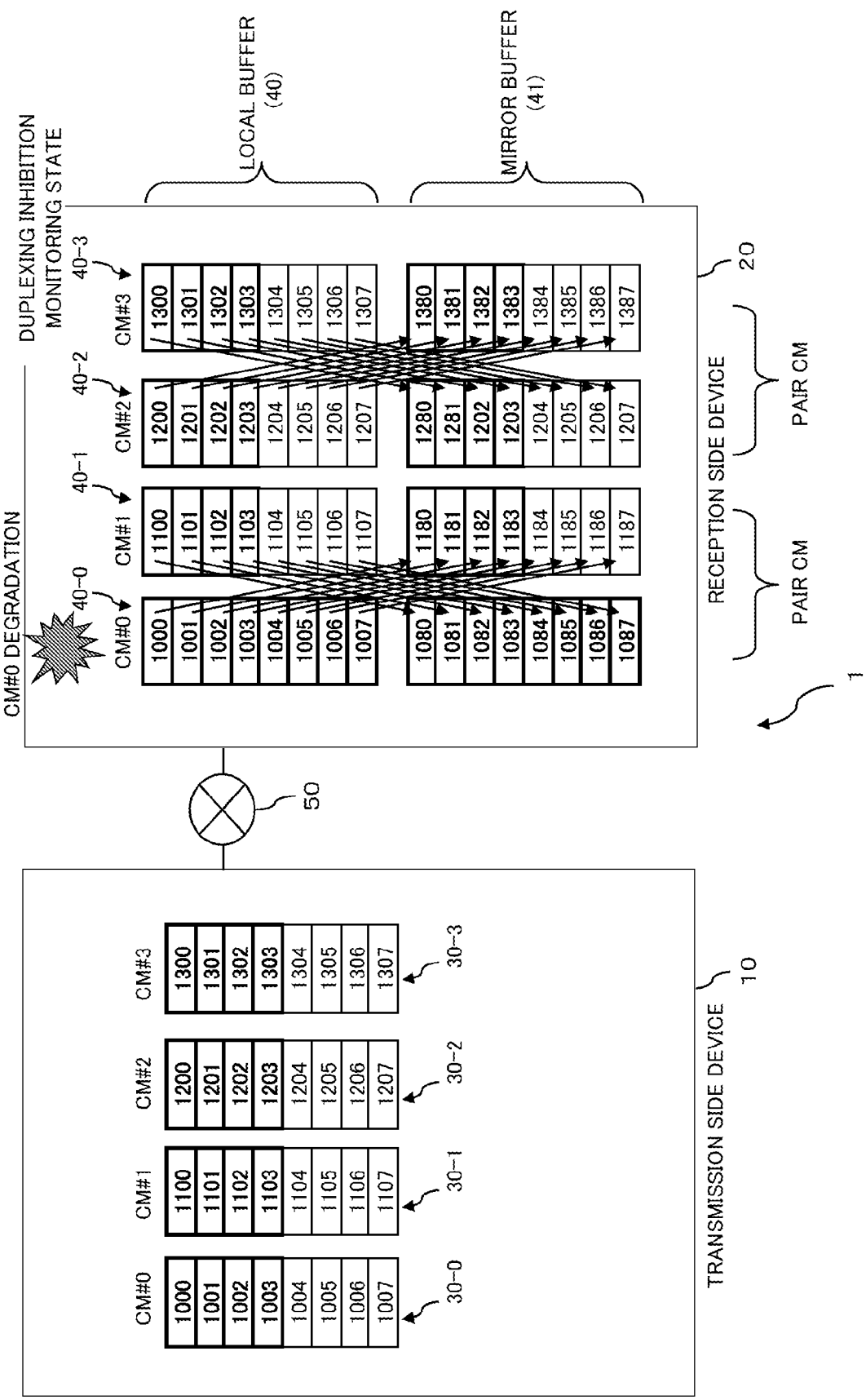
FIG. 14 is a diagram illustrating an example in which a CM of a storage device is degraded in a storage system according to an exemplary embodiment.

Next, the degradation process performed by the reception side degradation processing unit 24 in the storage system 1 according to the exemplary embodiment will be described according to a flowchart (steps C1 to C4) illustrated in FIG. 13 with reference to FIG. 14. FIG. 14 is a diagram illustrating an example in which in the storage system 1 according to the exemplary embodiment, a CM of the storage device 20 is degraded. In the example illustrated in FIG. 14, abnormality is detected in the CM #0 of the storage device 20, and the CM #0 is degraded.

When unrecoverable abnormality is detected in the CM #0 of the storage device 20 as illustrated in FIG. 14, the reception side degradation processing unit 24 sets the local buffer 40 of the CM #0 which is a degradation target to "unreceivable" (step C1).

Further, the reception side degradation processing unit 24 sets the mirror buffer 41 of the CM #0 which is a degradation target to "unmirrorable" (step C2). In other words, the CM #0 is degraded by perform a setting to prevent a copy of data from being stored in the local buffer 40 of the CM #1. Further, steps C1 and C2 may be inverted in order or may be simultaneously performed.

Thereafter, the reception side degradation processing unit 24 checks whether the CM #1 configuring a pair CM with the degraded CM #0 has been degraded, that is, whether both the CM #0 and the CM #1 configuring a pair CM have been degraded (step C3). When both of a pair of CMs are determined to have been degraded (see a YES route of step C3), in step C4, the reception side halt processing unit 25 performs the halt process (step C4), and then the process ends. Further, the halt process which will be described later with reference to FIGS. 15 and 16.

Further, when at least one of a pair of CMs (the CM #0 and the CM #1) has not been degraded (see a NO route of step C3), the process ends without change.

Figure 15:
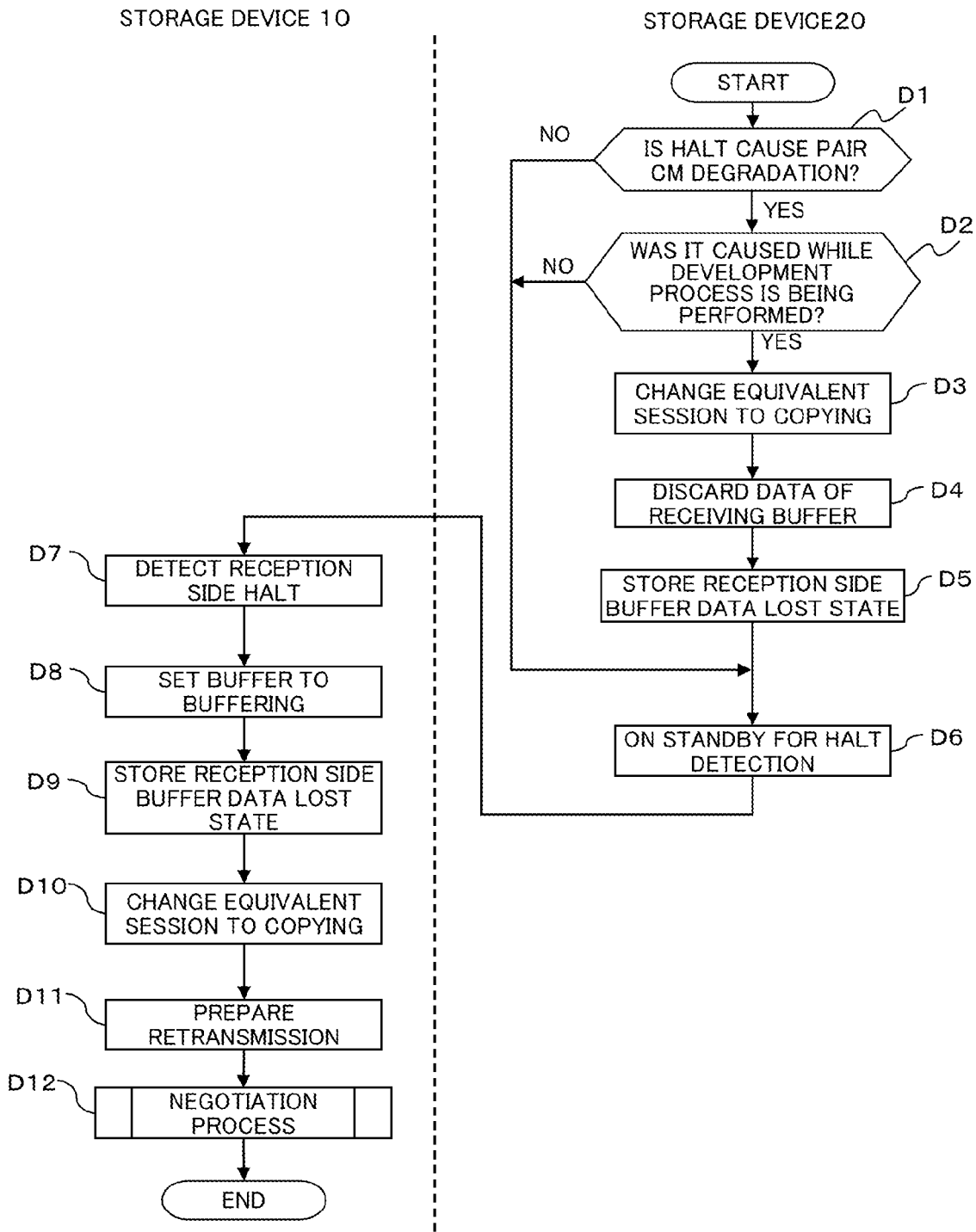
FIG. 15 is a flowchart for describing a halt process in a storage system according to an exemplary embodiment.

Next, the halt process in the storage system 1 according to the exemplary embodiment will be described according to a flowchart (steps D1 to D12) illustrated in FIG. 15 with reference to FIG. 16. FIG. 16 is a diagram illustrating a state in which the halt state is detected in the storage device 20 of the storage system 1 according to the exemplary embodiment. In the example illustrated in FIG. 16, both e CM #0 and the CM #1 configuring a pair CM in the storage device 20 have been degraded.

As described above, in the storage system 1, when two CMs configuring a pair CM have been simultaneously degraded, switching to the halt state is performed without entering the error suspension state.

When the halt state is detected, in the storage device 20, the reception side halt processing unit 25 checks whether a halt factor is degradation of both CMs configuring a pair CM (step D1). When the halt factor is determined to be pair degradation (see a YES route of step D1), then it is checked whether the halt was caused during development of data received in the storage device 20 (step D2).

When the halt was caused during the development (see a YES route of step D2), data stored in the REC buffers 40 and 41 in the storage device 20 are considered to be in a state in which there is no consistency between the storage device 10 and the storage device 20. The reception side halt processing unit 25 changes the copy session state (phase) in the session management table 204 from "equivalent (consistency)" to "copying (inconsistency)" through the table managing unit 27 (step D3). Through this operation, data stored in the REC buffers 40 and 41 in the storage device 20 is discarded.

The reception side halt processing unit 25 discards the data of the REC buffers 40 and 41 (step D4), and sets the reception side buffer data lost state to "lost state" in the buffer management table 202. In other words, the receiving buffer data lost state is stored (step D5). The reception side halt processing unit 25 is on standby for halt detection (step D6). Further, a standby for halt detection is implemented using a known technique, and thus a detailed description thereof is omitted.

Further, when the halt factor is not degradation of the CMs configuring the pair CM (see a NO route of step D1) or when the halt was not caused during the development (see a NO route of step D2), the process of steps D3 to D5 is skipped, and the process proceeds to step D6.

Meanwhile, in the storage device 10, the transmission side halt processing unit 15 detects the halt state in the storage device 20 (step D7), stops the data transfer to the storage device 20, and sets the buffer state to "buffering" (step D8). Through this operation, the data transfer to the storage device 10 by the transfer processing unit 123 is not performed, but storage (buffering) of data to the REC buffer 30 is performed.

The transmission side halt processing unit 15 sets "lost state" the reception side buffer data lost state in the buffer management table 102 through the table managing unit 17. In other words, the receiving buffer data lost state is stored (step D9).

Further, the transmission side halt processing unit 15 (the table managing unit 17) changes the copy session state (phase) in the session management table 104 from "equivalent (consistency)" to "copying (inconsistency)" (step D10).

Thereafter, the transmission side copy processing unit 12 prepares retransmission (step D11), and the transmission side negotiation processing unit 13 performs the negotiation process (step D12).

In the negotiation process, the same process as steps A3 to A9 of FIG. 10 is performed. In other words, the reception side negotiation processing unit 23 checks whether at least one of a pair of CMs has been upgraded for each pair CM. When at least one of CMs configuring a pair CM is determined to have been upgraded, the negotiation is performed. Through this operation, when "negotiated" is set to the negotiation states of the buffer management tables 102 and 202, and "active" is set to the buffer state, it becomes possible to perform the storage process or the buffer switching process on the REC buffers 30, 40, and 41 and to perform the data transfer from the storage device 10 to the storage device 20.

When it becomes possible to perform the data transfer from the storage device 10 to the storage device 20, the process subsequent to step B7 of FIG. 12 is performed. In other words, the data transfer from the storage device 10 to the storage device 20 is resumed.

The storage device 10 of the copy source resumes from copying of the lastly executed buffer set with reference the buffer set management table 103.

Through this operation, the sequentiality is guaranteed between the REC buffer 30 of the storage device 10 and the REC buffers 40 and 41 of the storage device 20, and thus it is possible to resume the sequentiality-guaranteed data transfer without re-establishing an REC session to perform initial copying.

Figure 17:
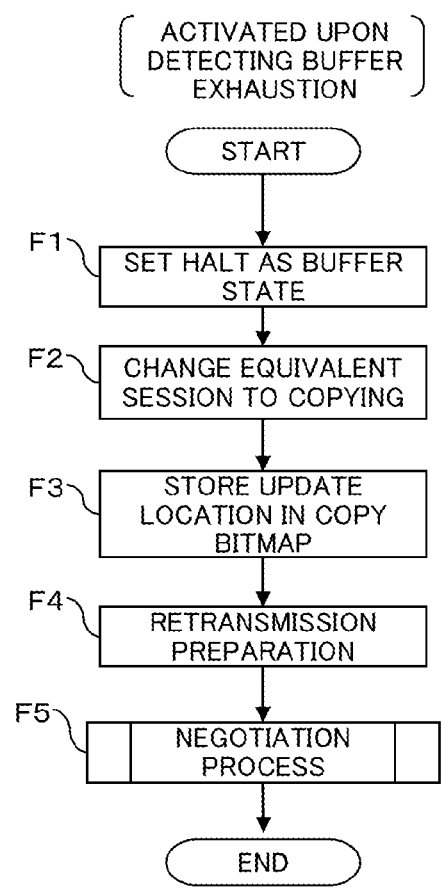
FIG. 17 is a flowchart for describing a process when an REC buffer is exhausted in a storage device of a storage system according to an exemplary embodiment.

Next, a process when the REC buffer 30 is exhausted in the storage device 10 of the storage system 1 according to the exemplary embodiment will be described according to a flowchart (steps F1 to F5) illustrated in FIG. 17.

When exhaustion of the REC buffer 30 is detected in the storage device 10, the table managing unit 17 sets "halt" as the buffer state in the buffer management table 102 (step F1).

Further, the table managing unit 17 changes a copy session of "equivalent" to "copying" in the session management table 104 (step F2).

When the host device 2 or the like changes a volume, the change location is stored in the copy bitmap (step F3). Thereafter, the transmission side copy processing unit 12 prepares retransmission (step F4), the transmission side negotiation processing unit 13 performs the negotiation process (step F5), and the process ends.

Figure 18:
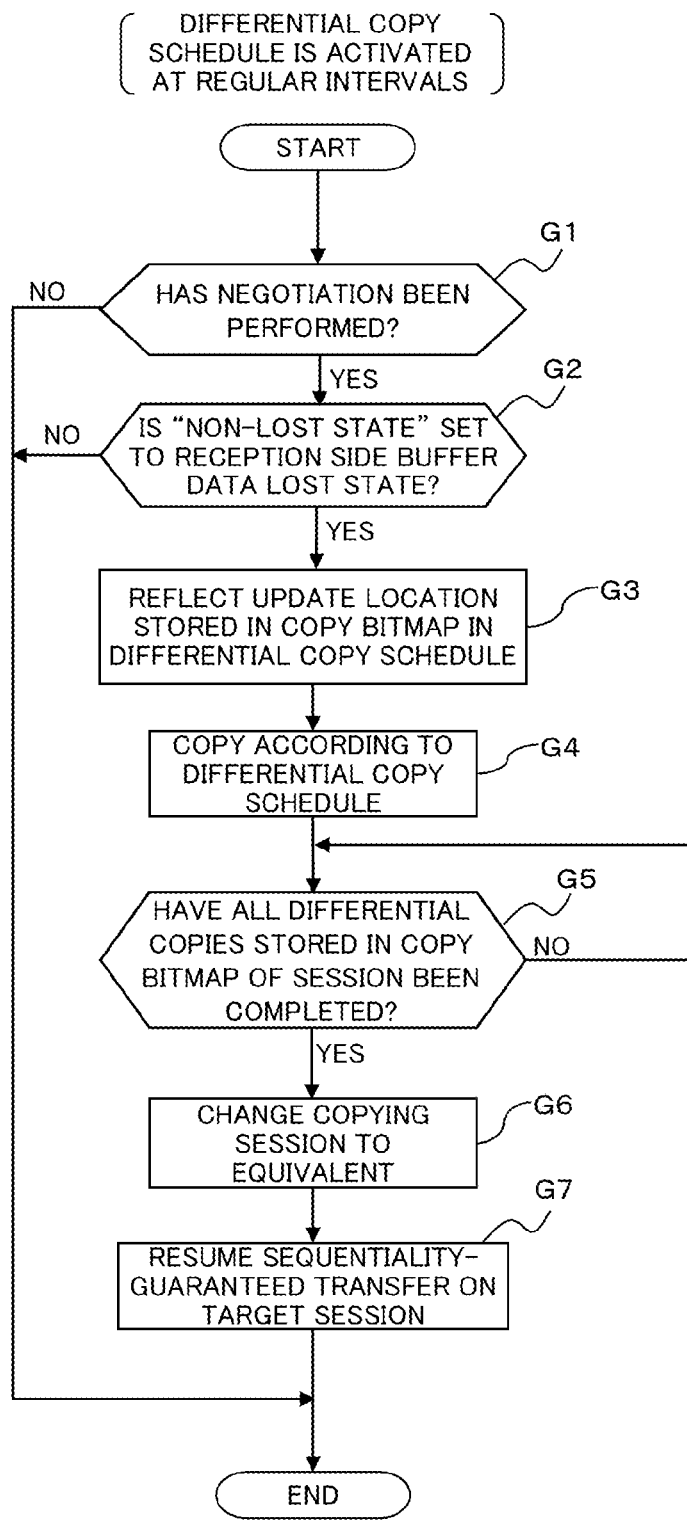
FIG. 18 is a diagram for describing a differential bitmap copy process in a storage device of a storage system according to an exemplary embodiment.

Next, the differential bitmap copy process in the storage device 10 of the storage system 1 according to the exemplary embodiment will be described with reference to a flowchart (steps G1 to G7) illustrated in FIG. 18. Further, in the storage device 10, a copy schedule (a differential bitmap copy schedule) of a differential bitmap copy is activates at regular intervals.

In the storage device 10, first, it is checked whether the transmission side negotiation processing unit 13 has performed the negotiation (step G1). When it is determined that the negotiation has not been performed (see a NO route of step G1), the process ends.

When it is determined that the negotiation has been performed (see a YES route of step G1), it is checked whether "non-lost state" is set to the reception side buffer data lost state in the buffer management table 102 (step G2).

When "non-lost state" is determined to be set to the reception side buffer data lost state (see a YES route of step G2), the transmission side copy processing unit 12 reflects the update location stored in the copy bitmap in the differential copy schedule (step G3).

The transmission side copy processing unit 12 performs the differential bitmap copy according to the differential copy schedule (step G4).

The transmission side copy processing unit 12 checks whether all differential copies stored in the copy bitmap of the session have been completed (step G5). When it is determined that the differential copy (differential bitmap copy) has not been completed (see a NO route of step G5), step G5 is repeatedly performed until the differential copy is completed.

When it is determined that the differential copy (differential bitmap copy) has been completed (see a YES route of step G5), the table managing unit 17 changes the copy session state (phase) in the session management table 104 from "copying" to "equivalent" (step G6).

Through this operation, it becomes possible to resume the sequentiality-guaranteed data transfer between the storage devices 10 and 20, and thus the REC consistency transfer (the sequentiality-guaranteed data transfer) illustrated in FIG. 12 is resumed between the storage devices 10 and 20 (step G7), and then the process ends.

Further, even when "lost state" is determined to be set to the reception side buffer data lost state (see a NO route of step G2), the process ends.

As described above, even when the halt state is caused due to exhaustion of the REC buffer 30 in the storage device 10, it is possible to resume the REC consistency transfer between the storage devices 10 and 20 as the differential bitmap copy is performed.

Figure 19:
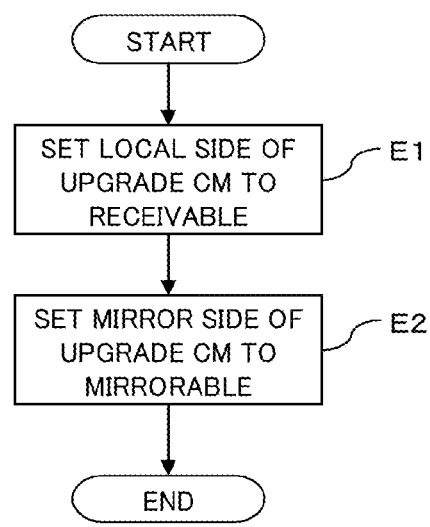
FIG. 19 is a flowchart for describing an upgrade process in a storage system according to an exemplary embodiment.

Next, the upgrade process performed by the reception side upgrade processing unit 26 in the storage system 1 according to the exemplary embodiment will be described according to a flowchart (steps E1 to E2) illustrated in FIG. 19 with reference to FIG. 20. FIG. 20 is a diagram illustrating a state in which in the storage device 20 of the storage system 1 according to the exemplary embodiment, upgrading has been performed. In the example illustrated in FIG. 20, in the storage device 20, the degraded CM #0 has been upgraded.

The reception side the upgrade processing unit 26 sets the local buffer 40 of the upgrade target CM (for example, the CM #0) to "receivable" (step E1).

Further, the reception side upgrade processing unit 26 sets the mirror buffer 41 of the CM #0 which is the upgrade target to "mirrorable" (step E2). In other words, the CM #0 is upgraded by performing a setting to allow a copy of data to be stored the local buffer 40 of the CM #1. Further, steps E1 and E2 may be inverted in order or may be simultaneously performed.

The pair degradation is solved by upgrading at least one of CMs in the pair degradation state. Through this operation, the transmission side negotiation processing unit 13 and the reception side negotiation processing unit 23 perform the negotiation (see a YES route of step A3 in FIG. 10). As the negotiation is performed, "active" is set as the buffer state, and the data transfer from the storage device 10 to the storage device 20 is resumed as described above.

(C) Effects

As described above, according to the storage system 1 according to the exemplary embodiment, when the REC consistency mode copy (the sequentiality-guaranteed data transfer) is performed from the storage device 10 to the storage device 20, switching to the halt state is performed without entering the error suspension state when the pair degradation occurs at the time of data development from the REC buffers 40 and 41 in the storage device 20 of the copy destination.

In the halt state, when the halt is determined to have occurred during development of data received in the storage device 20, the reception side halt processing unit 25 and the transmission side halt processing unit 15 change the copy session states (phases) in the session management tables 204 and 104 from "equivalent (consistency)" to "copying (inconsistency)." Further, the reception side halt processing unit 25 and the transmission side halt processing unit 15 set "lost state" to the reception side buffer data lost state in the buffer management tables 202 and 102.

Thereafter, when the data transfer is resumed between the storage devices 10 and 20 and "lost state" is determined to be set to the reception side buffer data lost state, the table managing units 27 and 17 change the copy session states (phases) in the session management tables 204 and 104 from "copying (inconsistency)" to "equivalent (consistency)." Through this operation, it is possible to continue the REC session, and it is possible to resume the sequentiality-guaranteed REC (REC consistency) only by copying the update difference. Thus, even when the pair degradation occurs in the storage device 20, it is possible to resume the data transfer in a short period of time without re-establishing the REC session to perform initial copying again from the beginning.

When at least one of CMs configuring a pair CM is upgraded in the pair degradation state, the transmission side negotiation processing unit 13 and the reception side negotiation processing unit 23 starts the negotiation process (see a YES route of step A3 in FIG. 10). As the negotiation is performed, "active" is set as the buffer state, and the data transfer from the storage device 10 to the storage device 20 is resumed as described above. In other words, the REC session from the storage device 10 to the storage device 20 is resumed without re-establishing the REC session between the storage device 10 and the storage device 20. At a point in time at which the storage device 10 is equivalent to the storage device 20, the sequentiality-guaranteed REC consistency operation is resumed. As described above, it is possible to resume the data transfer without re-establishing the REC session to perform the initial copying.

Further, in the storage device 20, when the development processing unit 212 completes the development process of data of the buffer set, the buffer release processing unit 213 notifies the storage device 10 of the receiving buffer IDs through the buffer release notification. In other words, the notification of the receiving buffer IDs of the released buffer areas and the release notification are transmitted to the storage device 10 through single communication. Through this operation, it is possible to transmit the available buffer notification from the storage device 20 to the storage device 10 in a short period of time, and it is possible to reduce the number of communications. Thus, it is possible to improve the transfer efficiency and effectively use the network 50.

In the case in which the pair degradation occurs in the storage device 20 during the sequentiality-guaranteed data transfer between the storage devices 10 and 20 and thus the copy session is stopped, when the copy session state transitions from "copying" to "equivalent" and the transfer is resumed, the storage device 10 of the copy source copies the lastly executed buffer set again with reference the buffer set management table 103.

As described above, the sequentiality between the REC buffer 30 of the storage device 10 and the REC buffers 40 and 41 of the storage device 20 is guaranteed, and it is possible to resume the sequentiality-guaranteed data transfer without re-establishing the REC session to perform the initial copy.

Further, when the pair degradation occurs in the storage device 20 during the sequentiality-guaranteed data transfer between the storage devices 10 and 20, the reception side halt processing unit 25 (the table managing unit 27) changes the copy session state (phase) in the session management table 204 from "equivalent (consistency)" to "copying (inconsistency)". Through this operation, even when a certain failure occurs in the storage device 10 of the copy source and data of the buffer set management table 103 is damaged, it is possible to detect there is no consistency in data of the REC buffers 30, 40, and 41 between the storage devices 10 and 20, and thus reliability can be improved.

(D) Others

The technology of the disclosure is not limited to the above embodiment, and various changes can be made within the scope not departing from the gist of the present embodiment. The configurations and processes of the present embodiment can be selected as necessary, and may be appropriately combined.

For example, the above embodiment has been described in connection with the example in which a copy of data of the disk device 131 of the storage device 10 is transferred to the storage device 20, and stores in the disk device 231 of the storage device 20, but the present invention is not limited to this example. A copy of data of the disk device 231 of the storage device 20 may be transferred to the storage device 10 and stored in the disk device 131 of the storage device 10. In other words, the storage device 20 may have the functions of the storage device 10, and the storage device 10 may have the functions of the storage device 20.

Further, a person skilled in the art can carry or manufacture the present embodiment according to the above-described disclosure.

According to an embodiment, when a redundancy failure occurs in the sequentiality-guaranteed data transfer, it is possible to resume the data transfer in a short period of time.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage system that transfers sequentiality-guaranteed data from a first storage device to a second storage device connected via a network, comprising:

two or more redundant receiving buffers that are respectively disposed in two or more redundant control devices in the second storage device and store data redundantly;

a session managing unit that manages a copy session state representing whether there is consistency of a copy state of the sequentiality-guaranteed data between the first storage device and the second storage device; and a buffer managing unit that manages a buffer data lost state representing that the sequentiality-guaranteed data has been lost in any of the two or more redundant receiving buffers, wherein when a factor that causes the second storage device to stop processing of the storage system is multiple failures in two or more redundant control devices during a process of developing data in a storage medium of the second storage device, the session managing unit sets inconsistency as the copy session state and also the buffer managing unit sets the buffer data lost state, and when a data transfer process is resumed between the first storage device and the second storage device and when the buffer data lost state is set by the buffer managing unit, the session managing unit sets consistency as the copy session state.

2. The storage system according to claim 1, wherein when at least one of the two or more redundant control devices is active while the processing of the storage system in the second storage device is stopped, the buffer managing unit sets a buffer state of the receiving buffer of the corresponding control device to an active state.

3. The storage system according to claim 1, wherein the second storage device notifies the first storage device of identification information of a receivable receiving buffer to be released this time by a buffer release notification when development is completed.

4. A storage control device equipped in a first or second storage device in a storage system that transfers sequentiality-guaranteed data from the first storage device to the second storage device connected via a network, the second storage device including two or more redundant receiving buffers, the storage control device comprising:
 a session managing unit that manages a copy session state representing whether there is consistency of a copy state of the sequentiality-guaranteed data between the first storage device and the second storage device; and
 a buffer managing unit that manages a buffer data lost state representing that the sequentiality-guaranteed data has been lost in any of the two or more redundant receiving buffers,
 wherein when a factor that causes the second storage device to stop processing of the storage system is multiple failures in two or more redundant control devices during a process of developing data in a storage medium of the second storage device, the session managing unit sets inconsistency as the copy session state and also the buffer managing unit sets the buffer data lost state, and
 when a data transfer process is resumed between the first storage device and the second storage device and when the buffer data lost state is set by the buffer managing unit, the session managing unit sets consistency as the copy session state.

5. The storage control device according to claim 4, wherein when at least one of the two or more redundant control devices is active while the processing of the storage system in the second storage device is stopped, the buffer managing unit sets a buffer state of the receiving buffer of the corresponding control device to an active state.

6. The storage control device according to claim 4, wherein the second storage device notifies the first storage device of identification information of a receivable receiving buffer to be released this time by a buffer release notification when development is completed.

7. A method of transferring sequentiality-guaranteed data from a first storage device to a second storage device, comprising:
 managing a copy session state representing whether there is consistency of a copy state of the sequentiality-guaranteed data between the first storage device and the second storage device;
 managing a buffer data lost state representing that the sequentiality-guaranteed data has been lost in any of the two or more redundant receiving buffers;
 when a factor that causes the second storage device to stop processing of the storage system is multiple failures in two or more redundant control devices during a process of developing data in a storage medium of the second storage device, setting inconsistency the copy session state and setting the buffer data lost state; and
 when a data transfer process is resumed between the first storage device and the second storage device and when the buffer data lost state is set, setting consistency is set as the copy session state.

8. The data transfer method according to claim 7, wherein when at least one of the two or more redundant control devices is active while the processing of the storage system in the second storage device is stopped, a buffer state of the buffer of the corresponding control device is set to an active state.

9. The data transfer method according to claim 7, wherein the second storage device notifies the first storage device of identification information of a receivable receiving buffer to be released this time by a buffer release notification when development is completed.

* * * * *